(12) United States Patent
Rhyner et al.

(10) Patent No.: US 10,406,845 B2
(45) Date of Patent: Sep. 10, 2019

(54) FLEXIBLE HINGE MATERIAL COMPRISING CROSS-LINKED POLYURETHANE MATERIAL

(71) Applicant: GEMALTO SA, Meudon (FR)

(72) Inventors: Steven J. Rhyner, Maplewood, MN (US); Christopher K. Haas, St.Paul, MN (US); Todd D. Jones, St. Paul, MN (US); Kui Chen-Ho, Woodbury, MN (US); Krystal K. Hunt, Hudson, WI (US); Ryan E. Marx, Rosemount, MN (US)

(73) Assignee: GEMALTO SA, Meudon (FR)

( * ) Notice: Subject to any disclaimer, the term of this patent is extended or adjusted under 35 U.S.C. 154(b) by 1173 days.

(21) Appl. No.: 13/844,591

(22) Filed: Mar. 15, 2013

(65) Prior Publication Data
US 2014/0265295 A1  Sep. 18, 2014

(51) Int. Cl.
*B42D 25/24* (2014.01)
*B42C 9/00* (2006.01)
(Continued)

(52) U.S. Cl.
CPC .......... *B42C 9/0043* (2013.01); *B42D 13/00* (2013.01); *B42D 25/00* (2014.10); *B42D 25/24* (2014.10); *B42D 25/305* (2014.10); *B42D 25/324* (2014.10); *B42D 25/328* (2014.10); *B42D 25/337* (2014.10); *B42D 25/351* (2014.10); *B42D 25/355* (2014.10); *B42D 25/36* (2014.10); *B42D 25/378* (2014.10); *B42D 25/382* (2014.10); *B42D 25/387* (2014.10); *B42D 25/391* (2014.10); *B42D 25/41* (2014.10); *B42D 25/455* (2014.10); *B42D 25/46* (2014.10); *B42D 25/465* (2014.10); *B42D 25/47* (2014.10); *C08G 18/0895* (2013.01); *C08G 18/42* (2013.01); *C08G 18/4277* (2013.01); *C08G 18/4854* (2013.01); *C08G 18/664* (2013.01); *C08G 18/6674* (2013.01); *C08G 18/73* (2013.01);
(Continued)

(58) Field of Classification Search
CPC .................................................. B42D 25/24
See application file for complete search history.

(56) References Cited

U.S. PATENT DOCUMENTS 2,984,645 A     5/1961   Hoeschele
3,779,794 A    12/1973   De Santis
(Continued)

FOREIGN PATENT DOCUMENTS

EP    1245407    10/2002
EP    1380442     1/2004
(Continued)

OTHER PUBLICATIONS http://en.wikipedia.org/wiki/Thermoplastic_polyurethane.*
PCT International Search Report from PCT/US2014/022907 dated Jul. 11, 2014, 3 pages.

*Primary Examiner* — Kyle R Grabowski
(74) *Attorney, Agent, or Firm* — The Jansson Firm; PEhr B. Jansson

(57) ABSTRACT

An article may include a biodata page defining a perimeter including an edge and a hinge layer attached to at least a portion of the biodata page. The hinge layer comprises a cross-linked polyurethane. In some examples, the hinge layer may include a cross-linked thermoset polyurethane.

25 Claims, 10 Drawing Sheets

(51) Int. Cl.
| | |
|---|---|
| *B42D 25/00* | (2014.01) |
| *B42D 25/41* | (2014.01) |
| *B42D 25/305* | (2014.01) |
| *B42D 25/36* | (2014.01) |
| *B42D 25/455* | (2014.01) |
| *B42D 25/324* | (2014.01) |
| *B42D 25/351* | (2014.01) |
| *B42D 25/46* | (2014.01) |
| *B42D 25/328* | (2014.01) |
| *B42D 25/355* | (2014.01) |
| *B42D 25/382* | (2014.01) |
| *B42D 25/47* | (2014.01) |
| *B42D 25/387* | (2014.01) |
| *B42D 25/391* | (2014.01) |
| *B42D 25/378* | (2014.01) |
| *B42D 25/337* | (2014.01) |
| *C08G 18/48* | (2006.01) |
| *C08G 18/66* | (2006.01) |
| *C08G 18/73* | (2006.01) |
| *C08G 18/75* | (2006.01) |
| *C08G 18/79* | (2006.01) |
| *C08G 18/08* | (2006.01) |
| *C08G 18/42* | (2006.01) |
| *B42D 13/00* | (2006.01) |
| *B42D 25/465* | (2014.01) |

(52) U.S. Cl.
CPC ......... *C08G 18/758* (2013.01); *C08G 18/792* (2013.01); *Y10T 156/10* (2015.01)

(56) References Cited

U.S. PATENT DOCUMENTS

| | | |
|---|---|---|
| 3,801,183 A | 4/1974 | Sevelin |
| 4,121,011 A | 10/1978 | Glover |
| 4,424,990 A | 1/1984 | White |
| 4,743,526 A | 5/1988 | Ando |
| 5,882,774 A | 3/1999 | Jonza |
| 6,179,948 B1 | 1/2001 | Merrill |
| 6,207,260 B1 | 3/2001 | Wheatley |
| 6,213,702 B1 | 4/2001 | Wesselink |
| 6,783,349 B2 | 8/2004 | Neavin |
| 7,040,981 B2 * | 5/2006 | Iliescu et al. .................. 283/74 |
| 7,648,744 B2 | 1/2010 | Kuo |
| 7,758,079 B2 * | 7/2010 | Beyer-Meklenburg et al. ............ 283/75 |
| 7,967,341 B2 | 6/2011 | Hahn |
| 8,336,915 B2 * | 12/2012 | Christen et al. ................ 283/74 |
| 2005/0248147 A1 * | 11/2005 | Staub et al. .................... 283/72 |
| 2007/0246931 A1 | 10/2007 | Hansen et al. |
| 2008/0191461 A1 * | 8/2008 | Syrjanen et al. ............... 283/94 |
| 2008/0191464 A1 | 8/2008 | Yankovitz |
| 2008/0309064 A1 | 12/2008 | Herlin |
| 2008/0309066 A1 | 12/2008 | Syrjanen |
| 2009/0097944 A1 * | 4/2009 | van den Berg et al. ..... 281/21.1 |
| 2010/0314162 A1 * | 12/2010 | Gardner et al. ........... 428/315.5 |
| 2011/0249334 A1 | 10/2011 | Merrill |
| 2012/0164419 A1 * | 6/2012 | Sakagami et al. ............ 428/216 |
| 2012/0187672 A1 | 7/2012 | Sakagami et al. |
| 2012/0319394 A1 * | 12/2012 | Christen et al. ............. 283/63.1 |

FOREIGN PATENT DOCUMENTS

| | | | |
|---|---|---|---|
| EP | 1502765 | | 2/2005 |
| EP | 1574359 | | 9/2005 |
| EP | 1878589 | | 1/2008 |
| WO | WO9819870 | * | 5/1998 |
| WO | WO 2002-28613 | | 4/2002 |
| WO | WO 2004-110780 | | 12/2004 |
| WO | WO 2005-028209 | | 3/2005 |
| WO | WO 2006-054072 | | 5/2006 |
| WO | WO 2006-054097 | | 5/2006 |
| WO | WO 2006-097276 | | 9/2006 |
| WO | WO 2013-090586 | | 6/2013 |

* cited by examiner

FLEXIBLE HINGE MATERIAL COMPRISING CROSS-LINKED POLYURETHANE MATERIAL

TECHNICAL FIELD

The disclosure relates to hinge materials for security documents, such as passport biodata pages.

BACKGROUND

Security articles, such as security documents and identification documents, are becoming increasingly important. Examples of identification documents include, but are not limited to, passports, driver's licenses, national ID cards, border crossing cards, security clearance badges, security cards, visas, immigration documentation and cards, gun permits, membership cards, phone cards, stored value cards, employee badges, debit cards, credit cards, and gift certificates and cards. Security articles may include personal identification information, which must be kept secure from tampering to ensure that counterfeiters or tamperers cannot produce counterfeit security articles or tamper with genuine security articles.

For example, passports include a biodata page that includes relevant personal information for the passport holder, including, for example, the passport holder's name, date of birth, photograph, etc. Increasingly, the biodata page is formed of polymer materials, such as polycarbonate. The biodata page may be printed or engraved with the passport holder's personal information and other relevant information. Additionally, the biodata page may include security features, such as radio frequency identification (RFID) chips, fluorescent dyes, surface structures (including graphics, text, diffractive elements, refractive elements, or the like), polarizing components, holograms, security printing such as rainbow guilloche or color-shifting inks, and the like, which increase the difficulty of modifying or replacing information carried by the biodata page by an unauthorized person without detection.

The biodata page may be incorporated into a passport document along with the other pages used to indicate where the passport holder has traveled. Under typical use conditions, a passport may be expected to last for up to 10 years or more.

SUMMARY

However, polycarbonate is stiff and not particularly tear resistant. Because of these properties, polycarbonate may not be a suitable hinge material for the biodata page, as it may not allow the passport booklet to fully close and may tear from the booklet relatively easily. In some examples, other materials have been used as hinge materials, including flexible thermoplastic materials. While flexible thermoplastic materials provide desirable mechanical properties, including flexibility and tear resistance, flexible thermoplastic materials may be thermally processed to separate the hinge from the polycarbonate. This may enable difficult-to-detect tampering with the biodata page by separating the hinge and the biodata page and, for example, attaching a different, counterfeit biodata page to the hinge.

In contrast to a thermoplastic material, the hinge material described in this disclosure comprises a cross-linked polyurethane. The cross-linked polyurethane may be a thermoset material, such that after cross-linking, the polyurethane cannot be reprocessed in the melt phase. This may complicate tampering, as the hinge may be more difficult to separate from the biodata page using heat without damaging the biodata page or leaving traces of the hinge material on the biodata page. Additionally, cross-linked polyurethane may possess selected chemical and mechanical properties, such as adhesion to polycarbonate, tear resistance, flexibility, and the like, which are desirable for use in a hinge material for a biodata page. For example, although the hinge material comprises a cross-linked polyurethane, and so substantially does not flow at the temperatures to which the hinge material will be exposed during attachment to the biodata page and during use, the hinge materials of the present disclosure surprisingly adhere strongly to polycarbonate, forming a bond that is difficult to separate.

In one example, the disclosure describes an article that includes a biodata page defining a perimeter including an edge, and a hinge layer attached to at least a portion of the biodata page. In accordance with this example, the hinge layer includes a cross-linked polyurethane, and a portion of the hinge layer extends beyond the edge to form a flexible hinge.

In another example, the disclosure describes a method comprising forming a hinge layer comprising a cross-linked polymer material and assembling the hinge layer with a biodata page. In accordance with this example, the biodata page defines a perimeter including an edge, a first portion of the hinge layer is positioned contacting the biodata page, and a second portion of the hinge layer extends beyond the edge. The method also includes attaching the first portion of the hinge layer to the biodata page.

The details of one or more examples are set forth in the accompanying drawings and the description below. Other features, objects, and advantages will be apparent from the description and drawings, and from the claims.

DETAILED DESCRIPTION

Figure 1:
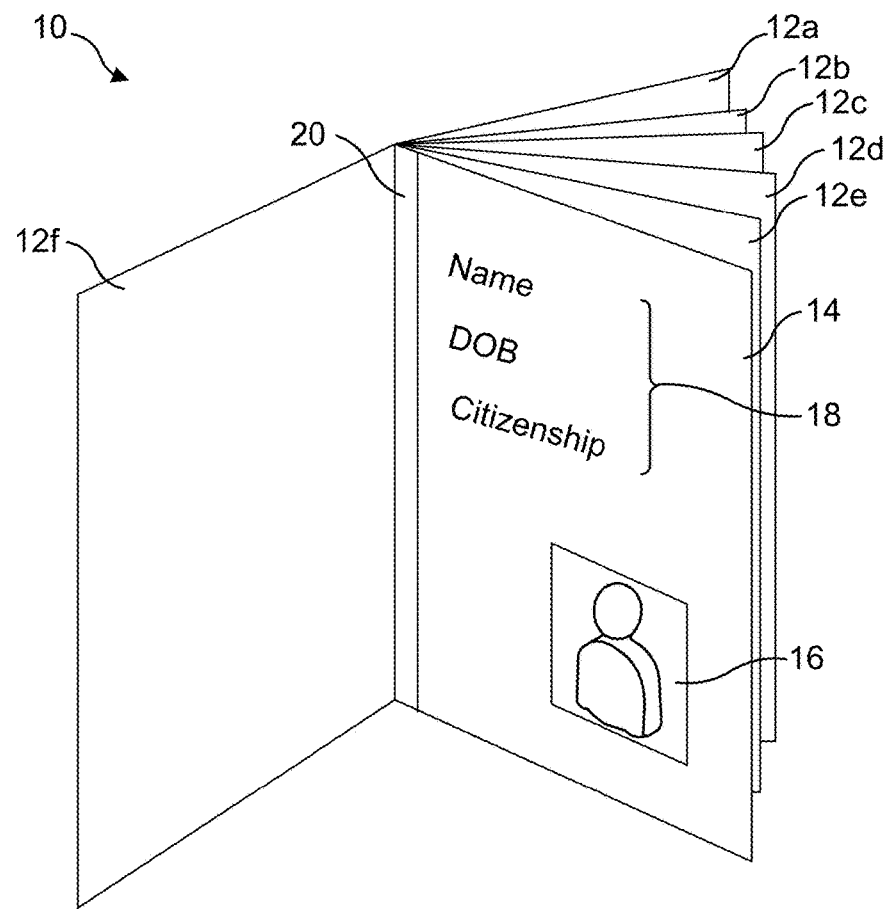
FIG. 1 is a conceptual diagram illustrating an example of a passport document including a biodata page in accordance with one or more examples of the disclosure.

The disclosure describes an article that includes a biodata page and a hinge layer comprising a cross-linked polyurethane. The hinge layer attaches to the biodata page and is difficult to separate using thermal processing, in contrast to thermoplastic materials. This complicates attempted tampering with the biodata page, and reduces a chance that the biodata page can be tampered with without damaging the biodata page.

In some examples, the cross-linked polyurethane may be referred to as a thermoset cross-linked polyurethane. As used herein, a thermoset cross-linked polyurethane is defined as a polyurethane that has been irreversibly cross-linked, i.e. through covalent bonding, in such a way as to provide a polyurethane which is resistant to flow, even under elevated temperatures. The extent of cross-linking in a thermoset polymer can be determined through measurement of the gel content, or fraction of insoluble material when a sample of the polyurethane is immersed in a known good solvent. Thermoset cross-linked polyurethanes useful in this invention contain at least 40% gel content. In some examples, the thermoset cross-linked polyurethanes may include at least 48% gel content, or at least 55% gel content. Without wishing to be bound by theory, thermoset polymers cannot be reprocessed by simple heating, i.e., extrusion; after cross-linking, the materials form an irreversible structure.

The cross-linked polyurethane also may be an elastomer. As used herein, elastomers are polymers, either cross-linked (thermoset elastomers) or uncross-linked (thermoplastic elastomers), which include a flexible, rubbery phase. As such, these materials may be flexible at room temperature, having a modulus of between about 0.1 megaPascals (MPa) and about 200 MPa, such as between about 0.1 MPa and about 100 MPa.

Cross-linked elastomeric polyurethane used in the hinge layer described herein may exhibit chain mobility at the temperature used to laminate the hinge layer to the biodata page. In some examples, the presence of chain mobility may be demonstrated by a melt onset temperature ($T_m$) above, approximately equal to, or below the temperature used to laminate the hinge layer to the biodata page. This chain mobility is characterized by a downturn in the elastic modulus vs. temperature plot of the hinge layer material, as determined using dynamic mechanical analysis. In some examples, the melt onset temperature, $T_m$, is greater than the lamination temperature (e.g., less than 45° C. above the lamination temperature), or is equal to the lamination temperature ($T_{lam}$), or is more than about 5° C. below $T_{lam}$, or is more than about 10° C. below $T_{lam}$.

In some examples, the cross-linked polyurethane may be mixed with and/or cross-linked with at least one other polymer. For example, the cross-linked polyurethane may be mixed with an acrylate, or may be reacted with an acrylate component precursor, such that the cross-linked polyurethane may include acrylate units within the cross-linked polyurethane. The acrylate component precursor may be any suitable monomer, oligomer, or polymer with an acrylate double bond available for polymerization. In examples in which the acrylate component precursor is copolymerized into the polyurethane, the acrylate component precursor may include one or more groups which polymerize with the polyurethane, such as alcohol or amine groups, and one or more acrylate double bonds available for polymerization. Other suitable species may include caprolactone acrylates, hydroxyethyl acrylate, dipentaerythritol pentaacrylate, and the like, or mixtures thereof. In some examples, the acrylate component may be cross-linked by electron beam or other radiation.

As another example, the cross-linked polyurethane may be mixed with and/or cross-linked with a polyurea. Polyureas may include polymers of polyisocyanates and polyamines.

FIG. 1 is a conceptual diagram illustrating an example passport booklet that includes an article including a biodata page and hinge layer comprising a cross-linked polyurethane in accordance with some examples of the disclosure. Passport booklet 10 is typically a booklet filled with several bound pages 12a-12f and 14. One of the bound pages is a biodata page 14, and includes personalized data, often presented as printed or engraved indicia or images. The personalized data contained by biodata page 14 can include one or more photographs 16, signatures, personal alphanumeric information 18, and barcodes, and allows human or electronic verification that the person presenting passport booklet 10 for inspection is the person to whom the passport booklet 10 is assigned. Biodata page 14 also may include a variety of covert and overt security features, such as those security features described in U.S. Pat. No. 7,648,744, entitled, "Tamper-Indicating Printable Sheet for Securing Documents of Value and Methods of Making the Same," the entire content of which is incorporated herein by reference.

In addition, biodata page 14 is attached to a hinge layer 20. Hinge layer 20 facilitates connection of biodata page 14 to the remaining pages 12a-12f of passport booklet 10. For example, hinge layer 20 may be sewn, stitched, or otherwise bound to the remaining pages to integrate biodata page 14 into passport booklet 10. In some examples, hinge layer 20 may be sewn to pages 12a-12f of passport booklet 10 using a security thread to increase the difficulty of forcibly removing biodata page 14 (and hinge layer 20) from the passport booklet 10.

Hinge layer 20 comprises a cross-linked polyurethane. In contrast to hinges formed from a thermoplastic, hinge layer 20 attaches to biodata page 14 and is difficult to separate using thermal processing. This complicates attempted tampering with biodata page 14, and reduces a chance that biodata page 14 can be tampered with without damaging biodata page 14.

In some examples, the cross-linked polyurethane may be a thermoset cross-linked polyurethane, in which the polyurethane is irreversibly cross-linked, i.e. through covalent bonding. The extent of cross-linking in a thermoset polymer can be determined through measurement of the gel content, or fraction of insoluble material when a sample of the polyurethane is immersed in a known good solvent. Hinge layer 20 may include a gel content of at least 40%. In some examples, hinge layer 20 may include a gel content of at least 48%, or at least 55%.

In some examples, the cross-linked polyurethane in hinge layer 20 also may be include an elastomer and may include a flexible, rubbery phase. As such, the material forming hinge layer 20 may be flexible at room temperature, having a modulus of between about 0.1 MPa and about 200 MPa, such as between about 0.1 MPa and about 100 MPa. In some examples, the cross-linked polyurethane may be mixed with at least one other polymer to form hinge layer 20.

Figure 2A:
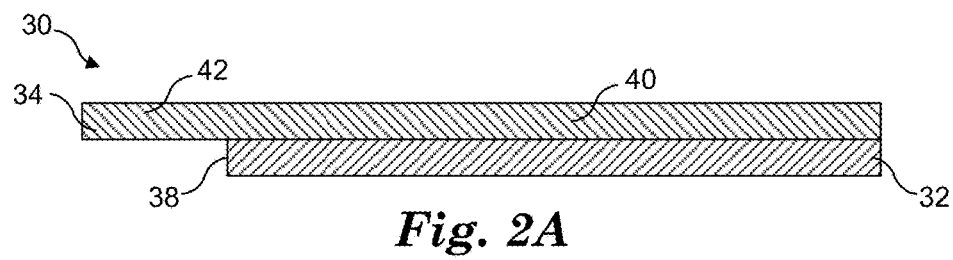
FIGS. 2A-5 are conceptual and schematic diagrams illustrating an example of an article including a biodata page and a hinge layer comprising a cross-linked polyurethane.
Figure 2B:
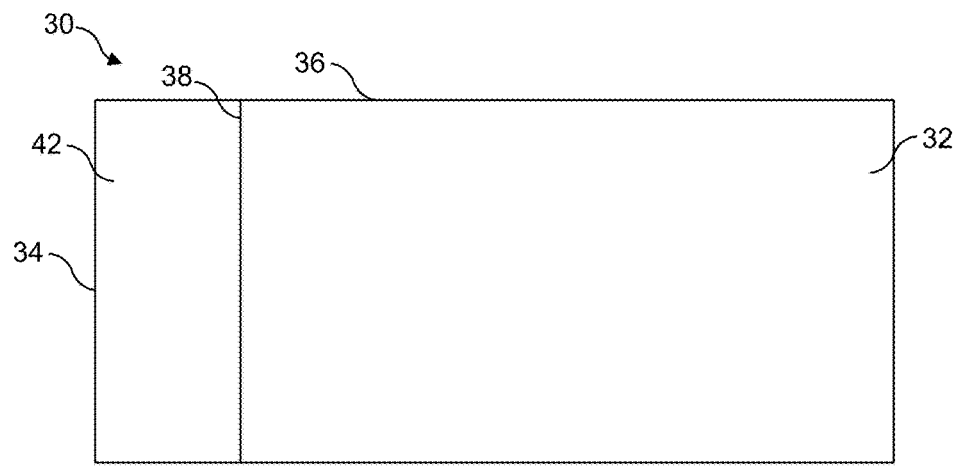

FIGS. 2A and 2B are conceptual and schematic diagrams illustrating an example of an article 30 including a biodata page 32 and a hinge layer 34. FIG. 2A illustrates an example of a cross-sectional view of the article 30, and FIG. 3B illustrates an example plan view of the article 30. In accordance with the disclosure, hinge layer 34 includes a crosslinked polyurethane.

Biodata page 32 defines a perimeter 36 that includes an edge 38. Hinge layer 34 includes a first portion 40 that contacts and is attached to biodata page 32 and a second portion 42 that extends beyond edge 38 of biodata page 32. Second portion 42 forms a flexible hinge for attaching article 30 to a security document, such as a passport book.

As shown in FIGS. 2A and 2B, the first portion 40 of hinge layer 34 contacts biodata page 32 substantially throughout a surface area defined within perimeter 36. In some examples, as shown in FIG. 2B, the perimeters of hinge layer 34 and biodata page 32 may be substantially aligned, except for the perimeter portions of hinge layer 34 that define second portion 42 (which extends beyond the edge 38 of biodata page 32). In other examples, as described with respect to FIG. 4 below, first portion 40 of hinge layer 34 may not extend along the entire surface of biodata page 32.

Biodata page 32 may include at least one layer of material into or onto which personal information may be inscribed or printed. In some examples, biodata page 32 includes at least one polymer layer. The polymer may include, for example, polycarbonate (PC), high density polyethylene (HDPE), polyethylene terephthalate (PET), or the like.

Figure 3:
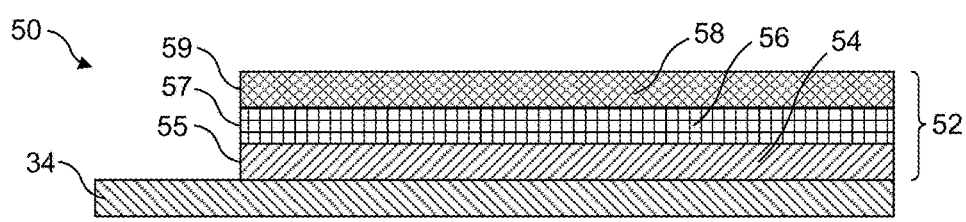

In some instances, as shown in FIG. 3, biodata page 32 may include a plurality of layers. FIG. 3 is a conceptual and schematic cross-sectional diagram illustrating another example of an article 50 including a biodata page 52 including a plurality of polymer layers and a hinge layer 34.

The plurality of polymer layers may include, for example, a first layer 54, a second layer 56, and a third layer 58. In some examples, at least one of first layer 54, second layer 56, and third layer 58 includes a radiation sensitive material, into which at least some of the personal information may be inscribed. The radiation sensitive material may facilitate storing of at least some of the personal information for the passport holder, including, for example, the passport holder's name, date of birth, photograph. The radiation sensitive material also may facilitate incorporation of one or more security features, such as floating images, within the biodata page 52.

The radiation sensitive material may include, for example, coatings and films of metallic, polymeric and semiconducting materials, as well as mixtures of these. As used herein, a material is "radiation sensitive" if, upon exposure to a given level of visible or other radiation, the appearance of the exposed material changes to provide a contrast with material that was not exposed to the radiation. The image created thereby could be the result of a compositional change within the material, a removal or ablation of the material, a phase change within the material, or a polymerization of the radiation sensitive material. Examples of radiation sensitive metallic film materials include aluminum, silver, copper, gold, titanium, zinc, tin, chromium, vanadium, tantalum, and alloys of any one or more of these metals. These metals typically provide a contrast between metal exposed to radiation and metal not exposed to radiation due to the difference between the native color of the metal and a modified color of the metal after exposure to the radiation. The image, as noted above, may also be provided by ablation, or by the radiation heating the material until an image is provided by optical modification of the material. U.S. Pat. No. 4,743,526, for example, describes heating a metal alloy to provide a color change. The entire content of U.S. Pat. No. 4,743,526 is incorporated herein by reference.

In addition to metallic alloys, metallic oxides and metallic suboxides can be used as a radiation sensitive material. Materials in this class include oxide compounds formed from aluminum, iron, copper, tin and chromium. Non-metallic materials such as zinc sulfide, zinc selenide, silicon dioxide, indium tin oxide, zinc oxide, magnesium fluoride and silicon can also provide a color or contrast upon exposure to radiation, and can be used as the radiation sensitive material.

Multiple layers of thin film materials can also be used to provide unique radiation sensitive materials. These multilayer materials can be configured to provide a contrast change by the appearance or removal of a color or contrast agent. Exemplary constructions include optical stacks or tuned cavities that are designed to be imaged (e.g., by a change in color) by specific wavelengths of radiation. One example is described in U.S. Pat. No. 3,801,183, which discloses the use of cryolite/zinc sulphide ($Na_3AlF_6$/ZnS) as a dielectric mirror. The entire content of U.S. Pat. No. 3,801,183 is incorporated herein by reference. Another example is an optical stack composed of chromium/polymer (such as plasma polymerized butadiene)/silicon dioxide/aluminum where the thicknesses of the layers are in the ranges of 4 nm for chromium, between 20 nm and 60 nm for the polymer, between 20 nm and 60 nm for the silicon dioxide, and between 80 nm and 100 nm for the aluminum, and where the individual layer thicknesses are selected to provide specific color reflectivity in the visible spectrum. Thin film tuned cavities could be used with any of the single layer thin films previously discussed. For example, a tuned cavity could include an approximately 4 nm thick layer of chromium and a silicon dioxide layer of between about 100 nm and 300 nm, with the thickness of the silicon dioxide layer being adjusted to provide a colored imaged in response to specific wavelengths of radiation.

The radiation sensitive material also can include thermochromic materials. "Thermochromic" describes a material that changes color when exposed to a change in temperature. U.S. Pat. No. 4,424,990 describes examples of thermochromic materials, which include copper carbonate, copper nitrate with thiourea, and copper carbonate with sulfur-containing compounds such as thiols, thioethers, sulfoxides, and sulfones. U.S. Pat. No. 4,121,011 describes examples of other suitable thermochromic compounds, including hydrated sulfates and nitrides of boron, aluminum, and bismuth, and the oxides and hydrated oxides of boron, iron, and phosphorus. The entire contents of U.S. Pat. Nos. 4,424,990 and 4,121,011 are incorporated herein by reference.

In other examples, the radiation sensitive material may include a multilayer polymer construction. The multilayer polymer construction may include absorption characteristics tailored to heat one or more of the layers upon exposure to suitable radiation, which may change a birefringence of at least some of the layers, which changes a reflective characteristic of the multilayer polymer construction. Examples of such materials are described in U.S. Patent Application Publication No. 2011/0249334 to Merrill et al., entitled, "Internally Patterned Multilayer Optical Films with Multiple Birefringent Layers," the entire content of which is incorporated herein by reference. The multilayer polymer construction may be fabricated using coextruding, casting, and orienting processes. Reference is made to U.S. Pat. No. 5,882,774 to Jonza et al., entitled, "Optical Film," U.S. Pat. No. 6,179,949 to Merrill et al., entitled, "Optical Film and Process for Manufacture Thereof," and U.S. Pat. No. 6,783,349 to Neavin et al., entitled "Apparatus for Making Multilayer Optical Films." The entire contents of each of these patents are incorporated herein by reference. The multilayer polymer construction may be formed by coextrusion of the polymers as described in any of the aforementioned references. The polymers of the various layers are preferably chosen to have similar rheological properties, e.g., melt viscosities, so that they can be co-extruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

In brief summary, the fabrication method may comprise: (a) providing at least a first and a second stream of resin corresponding to the first and second polymers to be used in the finished film; (b) dividing the first and the second streams into a plurality of layers using a suitable feedblock, such as one that comprises: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film. Furthermore, the layers of the cast film are typically all isotropic.

After cooling, the multilayer film can be drawn or stretched to produce the near-finished multilayer polymer construction, details of which can be found in the references cited above. The drawing or stretching accomplishes two goals: it thins the layers to their desired final thicknesses, and it orients the layers such that at least some of the layers become birefringent. The orientation or stretching can be accomplished along the cross-web direction (e.g. via a tenter), along the downweb direction (e.g. via a length orienter), or any combination thereof, whether simultaneously or sequentially. If stretched along only one direction, the stretch can be "unconstrained" (wherein the multilayer construction is allowed to dimensionally relax in the in-plane direction perpendicular to the stretch direction) or "constrained" (wherein the multilayer construction is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the multilayer construction may be stretched in a batch process. In any case, subsequent or concurrent draw reduction, stress or strain equilibration, heat setting, and other processing operations can also be applied to the multilayer construction.

In some cases, the natural or inherent absorptivity of one, some, or all of the constituent polymer materials that make up the multilayer optical film may be utilized for the absorptive heating procedure. For example, many polymers that are low loss over the visible region have substantially higher absorptivity at certain ultraviolet wavelengths. Exposing portions of the film to light of such wavelengths may be used to selectively heat such portions of the film.

In other cases, absorbing dyes, pigments, or other agents can be incorporated into some or all of the individual layers of the multilayer optical film to promote absorptive heating as mentioned above. In some cases, such absorbing agents are spectrally selective, whereby they absorb in one wavelength region but not in another. For example, an absorbing agent that absorbs at infrared or ultraviolet wavelengths but not substantially at visible wavelengths may be used. Further, an absorbing agent may be incorporated into one or more selected layers of a film. For example, the film may comprise two distinct microlayer packets separated by an optically thick layer such as a protective boundary layer (PBL), a laminating adhesive layer, one or more skin layers, or the like, and an absorbing agent may be incorporated into one of the packets and not the other, or may be incorporated into both packets but at a higher concentration in one relative to the other.

A variety of absorbing agents can be used. For optical films operating in the visible spectrum, dyes, pigments, or other additives that absorb in the ultraviolet and infrared (including near infrared) regions may be used. In some cases it may be advantageous to select an agent that absorbs in a spectral range for which the polymer materials of the film have a substantially lower absorption. By incorporating such an absorbing agent into selected layers of a multilayer optical film, directed radiation can preferentially deliver heat to the selected layers rather than throughout the entire thickness of the film. Exemplary absorbing agents may be melt extrudable so that they can be embedded into a selected layer set of interest. To this end, the absorbers are preferably reasonably stable at the processing temperatures and residence times required for extrusion. For further information on suitable absorbing agents, reference is made to U.S. Pat. No. 6,207,260, to Wheatley et al., entitled "Multicomponent Optical Body," the entire content of which is incorporated herein by reference.

Another radiation sensitive material includes laser-engravable polycarbonate. Laser-engravable polycarbonate can include clear polycarbonate containing an additive that absorbs radiation of a specific wavelength as heat and chars the polycarbonate. For example, some laser engravable polycarbonate may include an additive that absorbs infrared energy, such as energy with a wavelength of 1064 nm. Charring of the polycarbonate causes it to darken, which provides contrast with the surrounding clear polycarbonate.

At least one other of the first layer 54, second layer 56, and third layer 58 may include a clear polymer layer, and at least another of the first layer 54, second layer 56, and third layer 58 may include an opaque, e.g., white, polymer layer. For example, first layer 54 may include an opaque, e.g., white, polymer layer, second layer 56 may include a radiation sensitive material, and third layer 58 may include a clear polymer layer. In some examples, each of first layer 54, second layer 56, and third layer 58 may include a polymer, e.g., first layer 54 may include an opaque, e.g., white, polymer layer, second layer 56 may include laser-engravable polycarbonate, and third layer 58 may include a clear polymer layer. In such examples, the opaque, e.g., white, first layer 54 may improve visibility of images or text engraved in second layer 56, while the clear third layer 58 may allow viewing of the images or text engraved in second layer 56 through third layer 58. The opaque and clear polymer layers may be formed from any of a variety of polymers, including, for example, polycarbonate, polyethylene terephthalate (PET), and high density polyethylene (HDPE).

In some examples, biodata page 32 or 52 may include one or more security features embedded within or printed on a surface of biodata page 32 or 52. The security features may include any security features known to those of skill in the art, such as holograms; color printing within the film (e.g., an one or more surfaces of first layer 54, second layer 56, and/or third layer 58); an RFID chip; one or more fluorescent dyes; one or more taggants; one or more surface structures, which may form graphics, text, diffractive elements, and/or refractive elements; one or more embedded structures, e.g., within or between first layer 54, second layer 56, and/or third layer 58; one or more polarizing components; a clear-to-cyan film; a security thread; guilloche printing; color-shifting ink printing; or the like.

In some examples, in addition to or as an alternative to including one or more security features embedded within or formed on a surface of biodata page 32 or 52, hinge layer 34 may include one or more security feature. The security features may include any security features known to those of skill in the art, such as holograms; color printing within the hinge layer 34; an RFID chip; one or more fluorescent dye; one or more taggants; one or more surface structures, which may form graphics, text, diffractive elements, and/or refractive elements; one or more embedded structures; one or more polarizing components; a color-shifting film; a security thread; guilloche printing; color-shifting ink printing; or the like.

Hinge layer 34 includes a cross-linked polyurethane. In some examples, the cross-linked polyurethane is a thermoset polyurethane. Cross-linked polyurethane may possess desirable tear resistance while increasing the difficulty of tampering with article 30 or article 50. When hinge layer 34 includes a cross-linked polyurethane, thermal processing cannot be used to reversibly remove and reattach hinge layer 34.

Figure 4:
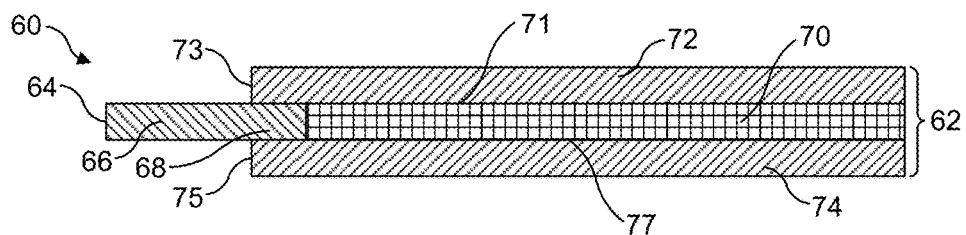

FIG. 4 is a conceptual and schematic cross-sectional diagram illustrating another example of an article 60 including a biodata page 62 including a plurality of polymer layers and a hinge layer 64. Article 60 may be similar to or substantially the same as article 30 shown in FIGS. 2A and 2B and/or article 50 shown in FIG. 3, aside from the differences described herein.

In contrast to the example article 50 shown in FIG. 3, hinge layer 64 in article 60 does not extend between the layers of biodata page 62 throughout the length of biodata page 62. Instead, hinge layer 64 includes a first portion 66 that extends beyond the edges 73 and 75 of second layer 72 and third layer 74, respectively. First portion 66 forms a hinge layer for attaching article 60 to a document, such as a passport book. Hinge layer 64 also includes a second portion 68, which extends between a portion of second layer 72 and a portion of third layer 74 and is attached to the portion of second layer 72 and the portion of third layer 74.

Biodata page 62 also includes a first layer 70, which is positioned between second layer 72 and third layer 74 throughout a remainder of the length and width of biodata page 62 (i.e., the portion that is not occupied by second portion 68 of hinge layer 64). First layer 70 may define a thickness that is approximately equal to the thickness of hinge layer 64, such that a surface 71 of second layer 72 contacts both hinge layer 64 and first layer 70 substantially throughout the surface area of surface 71. Similarly, a surface 77 of third layer 74 may contact both hinge layer 64 and first layer 70 substantially throughout the surface area of surface 77. This may allow sufficient mechanical connection between first layer 70 and second layer 72, first layer 70 and third layer 74, second layer 72 and hinge layer 64, and third layer 74 and hinge layer 64 upon attachment of the respective layers to each other.

Figure 5:
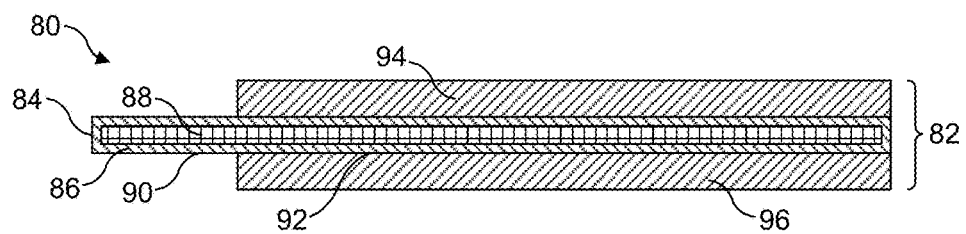

FIG. 5 is a conceptual and schematic cross-sectional diagram illustrating another example of an article 80 including a biodata page 82 including a plurality of polymer layers and a hinge layer 84. Article 60 may be similar to or substantially the same as article 30 shown in FIGS. 2A and 2B, article 50 shown in FIG. 3, and/or article 60 shown in FIG. 4, aside from the differences described herein.

Article 80 includes a hinge layer 84 that includes a filler material 88 and a matrix material 86 substantially encapsulating the filler 88. Together, filler material 88 and matrix material 86 form a composite hinge layer 84. Matrix material 86 may include a cross-linked polyurethane, which may be a thermoset and/or elastomeric polyurethane. In some examples, matrix material 86 may further include another polymer material, or may include other monomer units as a portion of the cross-linked polyurethane.

Filler material 88 may include, for example, a woven or non-woven material. In some examples, filler material 88 may include a polyester or a polyester satin woven or nonwoven material, which may be referred to as a net or a fabric. In other examples, filler material 88 may include a cotton fabric or a cotton blend fabric. In other examples, filler material 88 may include a microfiber fabric. In other examples, filler material 88 may include a non-woven fabric formed from thermoplastic fibers. For example, filler material 88 may include a non-woven polypropylene fabric. Additionally or alternatively, filler material 88 may include particles and/or pigments, such as carbon black and/or titania.

Filler material 88 may be substantially fully encapsulated by matrix material 86, such that cross-linked polyurethane substantially fully surrounds the filler material 88. In this way, the filler material 88 may contribute mechanical properties to hinge layer 84, such as tear resistance, while the cross-linked polyurethane in second portion 92 of hinge layer 84 contacts first layer 94 and second layer 96 of biodata page 82 to attach hinge layer 84 to biodata page 82. First portion 90 of hinge layer 84 extends beyond or protrudes from between first layer 94 and second layer 96 to form a flexible hinge for attaching article 80 to a security document, such as a passport booklet.

Figure 6:
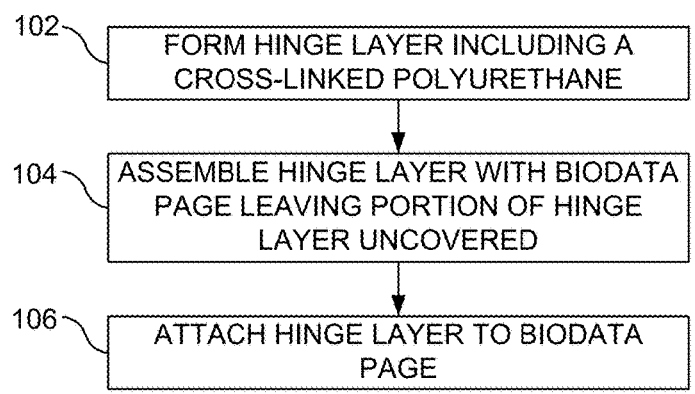
FIGS. 6 and 7 are flowcharts illustrating example techniques for forming an article including a biodata page and a hinge layer comprising a cross-linked polyurethane.

FIG. 6 is a flow diagram that illustrates an example technique for forming an article including a biodata page and a hinge layer comprising a cross-linked polyurethane. The technique of FIG. 6 will be described with reference to article 30 of FIGS. 2A and 2B for reference only, and can be used to form other assemblies including a biodata page and a hinge layer comprising a cross-linked polyurethane, such as article 50 of FIG. 3.

The technique of FIG. 6 includes forming a hinge layer 34 including a cross-linked polyurethane (102). Hinge layer 34 may be formed by any of a variety of techniques, including, for example, reactive extrusion, reactive casting, extrusion followed by radiation-induced cross-linking, casting followed by radiation-induced cross-linking, or the like. Examples of techniques for forming hinge layer 34 are described in additional detail with reference to FIGS. 8-12. In some examples in which hinge layer 34 is formed by reactive extrusion or reactive casting, the cross-linked polyurethane may be formed from monomers in which at least some of the monomers including multiple reactive functional groups, such as tri-isocyanates and/or tri-alcohols. In other examples in which hinge layer 34 is formed by reactive extrusion or reactive casting, the cross-linked polyurethane may be formed by including a cross-linking agent, such as a glycerol or another triol, within the reaction mixture.

The technique of FIG. 6 also includes assembling the hinge layer 34 with biodata page 32, leaving second portion 42 of hinge layer 34 uncovered (104). As shown in FIG. 2, a surface of first portion 40 of hinge layer 34 contacts a surface of biodata layer 32, while second portion 42 extends past edge 38 of biodata page 32. Second portion 42 can then form a flexible hinge for attaching article 30 to a security document, such as a passport booklet.

After assembling the hinge layer 34 with biodata page 32 (104), the technique of FIG. 6 includes attaching hinge layer 34 to biodata page 32 (106). Hinge layer 34 may be attached to biodata page 32 using any of a variety of techniques, including, for example, lamination, an adhesive, ultrasonic welding, solvent welding, thermal welding, hot gas welding, contact welding, friction welding, or the like. In some examples, such as when hinge layer 34 includes an elastomeric cross-linked polyurethane, hinge layer 34 may be laminated to biodata page 32, as hinge layer 34 adheres sufficiently to biodata page 32 without a separate adhesive.

Figure 7:
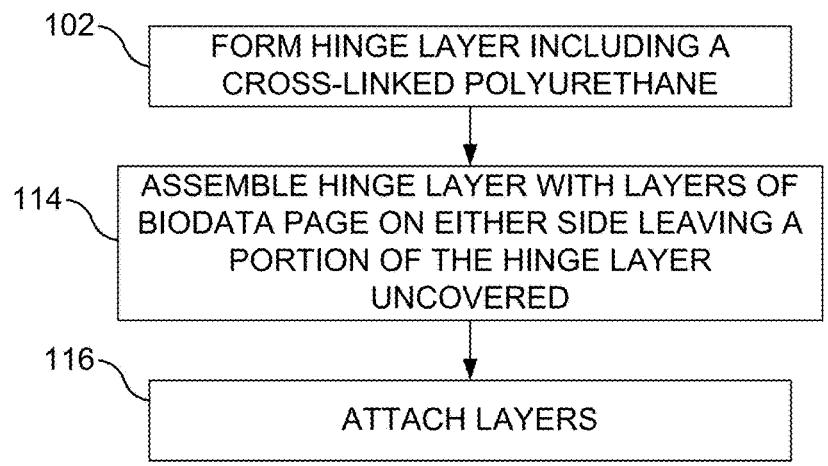

FIG. 7 is a flow diagram that illustrates another example technique for forming an article including a biodata page and a hinge layer comprising a cross-linked polyurethane. The technique of FIG. 7 will be described with reference to article 80 of FIG. 5 for reference only, and can be used to form other assemblies including a biodata page and a hinge layer comprising a cross-linked polyurethane, such as article 60 of FIG. 4.

Similar to the technique of FIG. 6, the technique of FIG. 7 includes forming a hinge layer 84 including a cross-linked polyurethane (102). Hinge layer 84 may be formed by any of a variety of techniques, including, for example, reactive extrusion, reactive casting, extrusion followed by radiation-induced cross-linking, casting followed by radiation-induced cross-linking, or the like. Examples of techniques for forming hinge layer 84 are described in additional detail with reference to FIGS. 8-12.

In the example of FIG. 5, hinge layer 84 includes a filler material 88. In examples in which hinge layer 84 includes filler material 88, the technique of FIG. 7 includes disposing filler material 88 within hinge layer 84, e.g., substantially fully encapsulated within matrix material 86, which includes the cross-linked polyurethane. Filler material 88 may be disposed within matrix material 86 when matrix material 86 is in the melt phase or prior to the reaction that forms the cross-linked polyurethane. For example, when hinge layer 84 is formed by reactive extrusion, filler material 88 may be dispensed within hinge layer 84 as the polyurethane exists the extruder and prior to the polyurethane being fully cured (e.g., crosslinked). In other examples, filler material 88 may be mixed with the polyurethane precursors or polyurethane melt within the extruder.

The technique of FIG. 7 further includes assembling hinge layer 84 with layers of biodata page 82 on either side, leaving first portion 90 of hinge layer 84 uncovered or exposed (114). As shown in FIG. 5, a first surface of second portion 92 of hinge layer 84 contacts a surface of first layer 94 of biodata page 82, and a second surface of second portion 92 of hinge layer 84 contacts a surface of second layer 96 of biodata page 82. First portion 90 of hinge layer 84 extends or protrudes past the edges of first layer 94 and second layer 96. First portion 90 can then form a flexible hinge for attaching article 80 to a security document, such as a passport booklet.

Once hinge layer 84 has been assembled with first layer 94 and second layer 96 of biodata page 82 (114), the technique of FIG. 7 includes attaching hinge layer 84 to first layer 94 and second layer 96 (116). Hinge layer 84 may be attached to first layer 94 and second layer 96 using any of a variety of techniques, including, for example, lamination, an adhesive, ultrasonic welding, solvent welding, thermal welding, hot gas welding, contact welding, friction welding, or the like. In some examples, such as when hinge layer 84 includes an elastomeric cross-linked polyurethane, hinge layer 84 may be laminated to first layer 94 and second layer 96, as hinge layer 84 adheres sufficiently to first layer 94 and second layer 96 without a separate adhesive.

Figure 8:
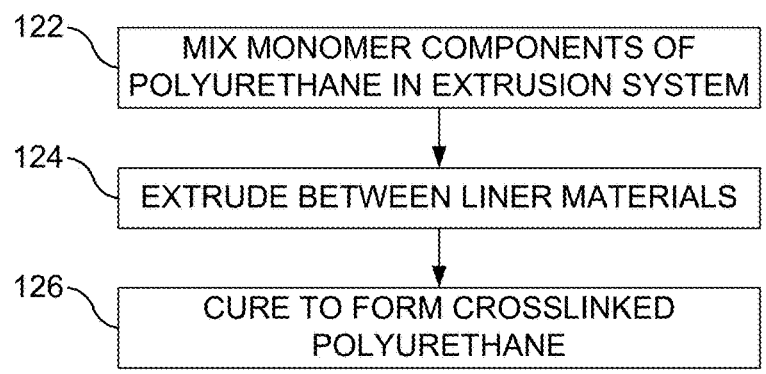
FIG. 8 is a flowchart illustrating an example technique for forming a hinge layer comprising a cross-linked polyurethane.

FIG. 8 is a flow diagram that illustrates an example technique for forming a hinge layer including a cross-linked polyurethane, in accordance with some examples of the disclosure. The technique of FIG. 8 will be described with reference to FIG. 9, which shows a conceptual and schematic diagram of an example system 130 for performing the technique of FIG. 8.

The technique of FIG. 8 includes mixing monomer components of polyurethane in an extrusion system (122). Monomer components of polyurethane may include, for example, isocyanates and polyols. Isocyanate monomers may include aliphatic isocyanates, cycloisocyanates, aromatic isocyanates, toluene diisocyanate, methylene diphenyl diisocyanate, or the like. In some examples, the isocyanate monomers may include two, three, or more reactive functional groups (e.g., diisocyanates or triisocyanates). Diisocyanates may contribute to a linear polyurethane formation, while isocyanates including three or more reactive groups may form cross-linking sites.

Polyol monomers may include, for example, polyether polyols, polyester polyols, glycols, glycerol, sucrose, sorbitol, polycarbonate polyols, polycaprolactone polyols, polybutadiene polyols, polysulfide polyols, natural oil polyols, or the like. In some examples, the isocyanate monomers may include two, three, or more reactive functional groups (e.g., diols or triols). Diols (di-alcohols) may contribute to a linear polyurethane formation, while polyols including three or more reactive groups may form cross-linking sites.

Figure 9:
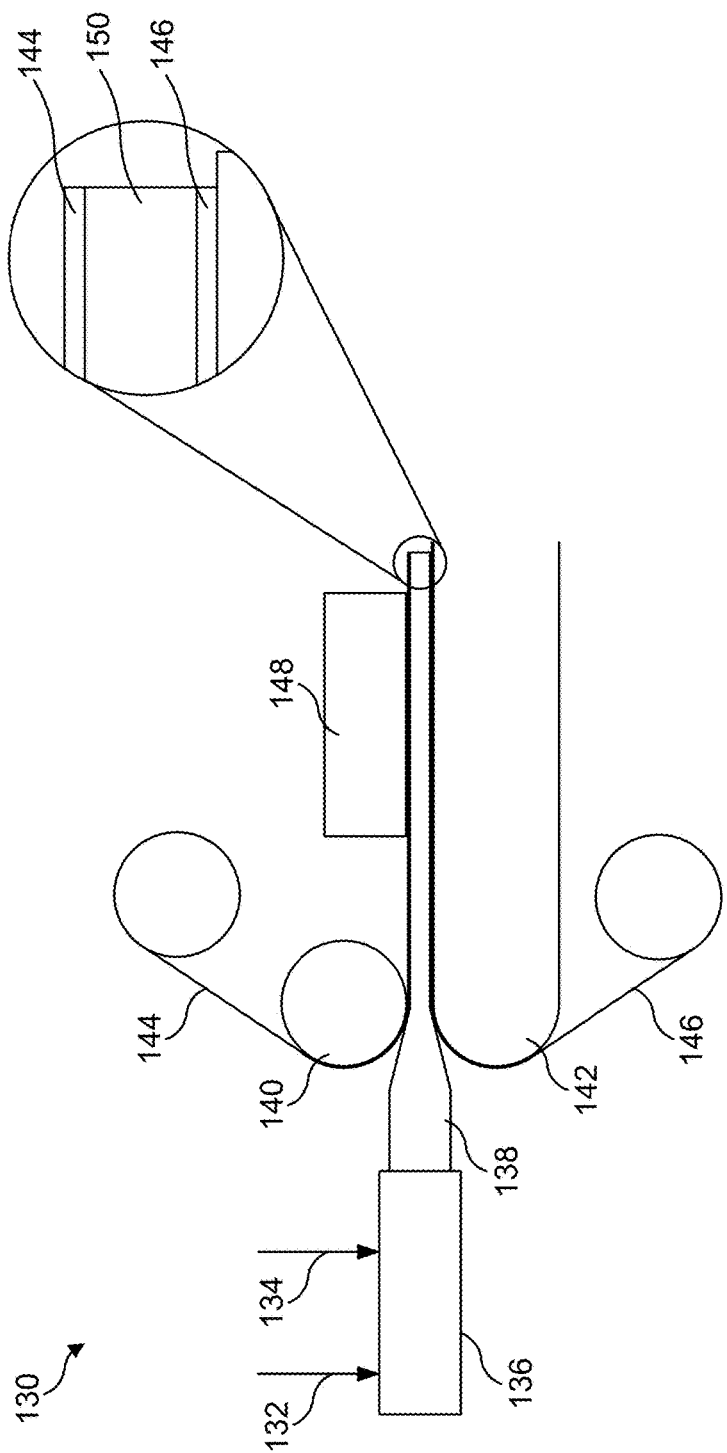
FIG. 9 is a conceptual and schematic diagram illustrating an example system for performing the technique of FIG. 8.

As shown in FIG. 9, the isocyanate monomer may be introduced into an extruder 136 through a first feed 132, and the polyol monomer may be introduced into extruder 136 through a second feed 134. Extruder 136 may be, for example, a single screw or twin-screw extruder, and may include at least a feed zone, where the first feed 132 and second feed 134 enter extruder 136, and a mixing zone, where the polyol and isocyanate monomers are mixed.

After mixing, the monomer components, which may be begun to polymerize, may be extruded between liner materials (124). As shown in FIG. 9, a mixture 138 of the monomer components, which may be partially polymerized, exits a die at the end of extruder 136 and passes between a first roller 140 and a second roller 142. As mixture 138 passes between first roller 140 and second roller 142, a first liner 144 and a second liner 146 are positioned on either side of mixture 138. First liner 144 passes along a surface of first roller 140 between first roller 140 and mixture 138, and second liner 146 passes along a surface of second roller 142 between second roller 142 and mixture 138. First liner 144 and second liner 146 may be formed of a material that is substantially inert to the monomers in mixture 138 and the resultant polyurethane, such that liners 144 and 146 do not adhere to mixture 138 or the resultant polyurethane. In some examples, liners 144 and 146 may include polyethylene terephthalate (PET) or another polymer with low adhesion to mixture 138 and the resultant polyurethane.

Although not shown in FIG. 8, in some examples, a filler material may be mixed or introduced into mixture 138, e.g., before mixture 138 passes between first roller 140 and second roller 142. For example, the filler material may include a woven or non-woven fabric, which may be in the form of a sheet or roll. The woven or non-woven fabric may be introduced into mixture 138 using a roller system similar to those used to dispense liners 144 and 146. As described above with respect to FIG. 5, in some examples, mixture 138 may substantially fully encapsulate the filler material, such that polyurethane substantially fully surrounds the filler material.

As mixture 138 passes between first roller 140 and second roller 142, the thickness of the resulting film may be defined, e.g., by the spacing between surfaces of first roller 140 and second roller 142. After passing between first roller 140 and second roller 142, mixture 138 may be exposed to an energy source 148, which cures mixture 138 to form the cross-linked polyurethane (126). Energy source 148 may be, for example, a thermal energy source, such as heated platens between which the mixture 138 passes. The heated platens thermally cure mixture 138. As another example, energy source 148 may include an ultraviolet (UV) source, which exposes mixture 138 to UV radiation to cure mixture 138 and form the cross-linked polyurethane 150.

Although not shown in FIG. 8, the technique may further include separating cross-linked polyurethane 150 into individual hinge layers. For example, cross-linked polyurethane 150 may be cut to the desired shape using mechanical or thermal means.

Figure 10:
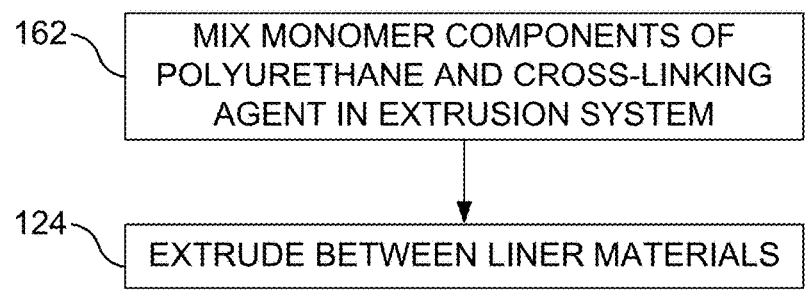
FIG. 10 is a flowchart illustrating an example technique for forming a hinge layer comprising a cross-linked polyurethane.

FIG. 10 is a flow diagram that illustrates an example technique for forming a hinge layer including a cross-linked polyurethane, in accordance with some examples of the disclosure. The technique of FIG. 10 will be described with reference to FIG. 11, which shows a conceptual and schematic diagram of an example system 170 for performing the technique of FIG. 10. System 170 of FIG. 11 may be similar to or substantially the same as system 130 of FIG. 9, aside from the differences described herein.

The technique of FIG. 10 includes mixing monomer components of polyurethane and a cross-linking agent in an extrusion system (162). Monomer components of polyurethane may include, for example, isocyanates and polyols. In some examples, the isocyanate monomers may include two, three, or more reactive functional groups (e.g., diisocyanates or triisocyanates). Similarly, in some examples, the isocyanate monomers may include two, three, or more reactive functional groups (e.g., diols or triols).

Cross-linking agents may include molecules with three or more reactive functional groups, which function as branch points in the polyurethane backbone and allow formation of cross-links between different polyurethane chains. Example cross-linking agents include glycerol, trimethylpropane, 1,2, 6-hexanetriol, triethanolamine, pentaerythritol, or the like.

Figure 11:
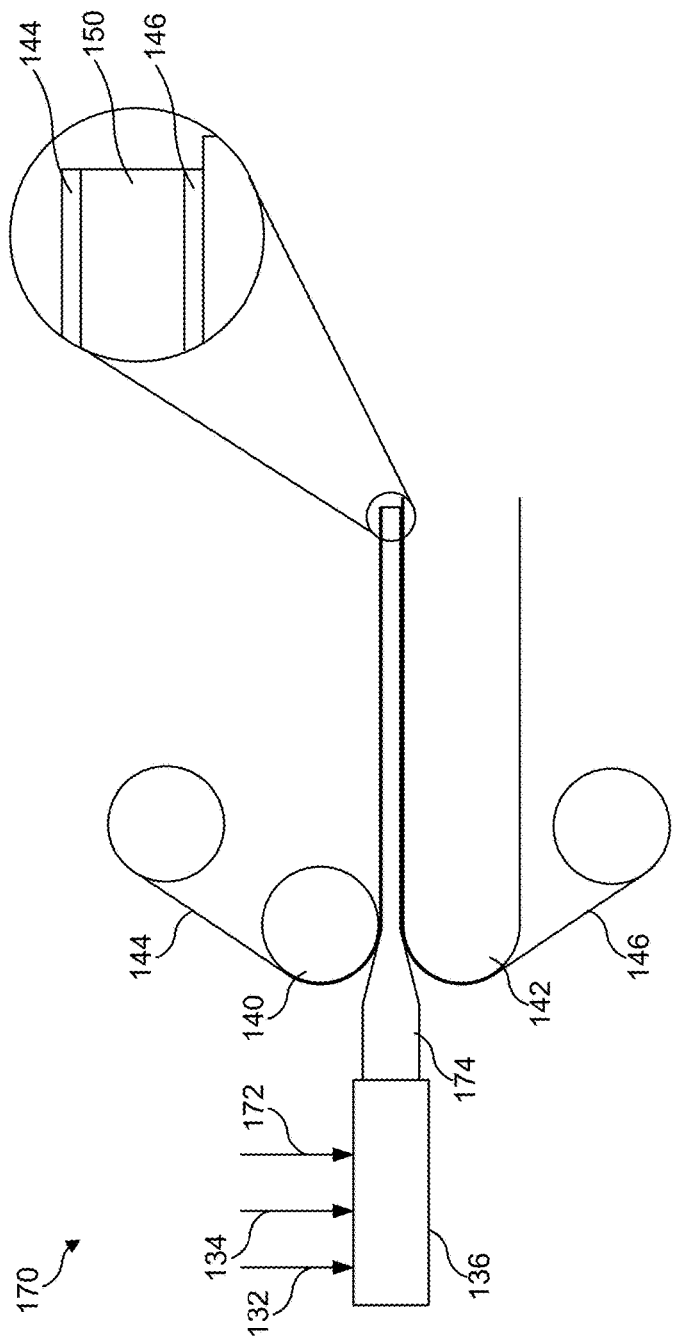
FIG. 11 is a conceptual and schematic diagram illustrating an example system for performing the technique of FIG. 10.

As shown in FIG. 11, the isocyanate monomer may be introduced into an extruder 136 through a first feed 132, the polyol monomer may be introduced into extruder 136 through a second feed 134, and the cross-linking agent may be introduced into extruder 136 through a third feed 172. Extruder 136 may be, for example, a single screw or twin-screw extruder, and may include at least a feed zone, where the first feed 132, second feed 134, and third feed 172 enter extruder 136, and a mixing zone, where the polyol monomer, isocyanate monomer, and cross-linking agent are mixed.

After mixing, the monomer components, which may be begun to polymerize, are extruded between liner materials (124). As shown in FIG. 11, a mixture 174 of the monomer components, which may be partially polymerized, exits a die at the end of extruder 136 and passes between a first roller 140 and a second roller 142. As mixture 174 passes between first roller 140 and second roller 142, a first liner 144 and a second liner 146 are positioned on either side of mixture 174. First liner 144 passes along a surface of first roller 140 between first roller 140 and mixture 174, and second liner 146 passes along a surface of second roller 142 between second roller 142 and mixture 174.

Although not shown in FIG. 10, in some examples, a filler material may be mixed or introduced into mixture 174, e.g., before mixture 174 passes between first roller 140 and second roller 142. As mixture 174 passes between first roller 140 and second roller 142, the thickness of the resulting film may be defined, e.g., by the spacing between surfaces of first roller 140 and second roller 142. While mixture 174 passes between first roller 140 and second roller 142, and afterwards, the cross-linking reaction is allowed to proceed to form cross-linked polyurethane 150. In some examples, the cross-linking reaction may be accelerated by heating mixture 174, e.g., using a heat source or UV source. In other examples, the cross-linking reaction may proceed at ambient temperatures.

Although not shown in FIG. 10, the technique may further include separating cross-linked polyurethane 150 into individual hinge layers. For example, cross-linked polyurethane 150 may be cut to the desired shape using mechanical or thermal means.

Figure 12:
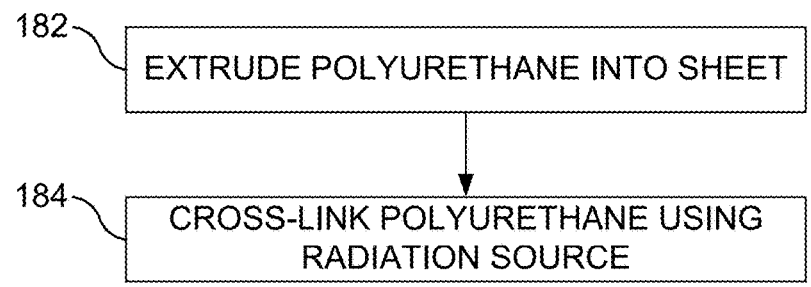
FIG. 12 is a flowchart illustrating an example technique for forming a hinge layer comprising a cross-linked polyurethane.

In other examples, a non-cross-linked polyurethane may be formed and subsequently cross-linked. FIG. 12 is a flow diagram that illustrates an example technique for forming a hinge layer including a cross-linked polyurethane, in accordance with some examples of the disclosure. The technique of FIG. 12 includes extruding polyurethane into a sheet (182). The polyurethane may be extruded using a system similar to system 130 of FIG. 9 and/or system 180 of FIG. 11. However, instead of a reactive extrusion process in which monomers react to form a polyurethane, the polyurethane sheet may be extruded from a plurality of polyurethane pellets. The thickness of the sheet may be defined, for example, by a distance between first roller 140 and second roller 142.

After being extruded into a sheet, the polyurethane may be cross-linked using a radiation source (184). The radiation source may be, for example, a UV radiation source, electron-beam radiation source, or corona treatment source. The cross-linked polyurethane then may be separated into individual hinge layers, as described above.

Regardless of the technique by which the hinge layer including the cross-linked polyurethane is formed (e.g., the techniques of FIGS. 8, 10, and/or 12), the resulting hinge layer may be incorporated into any of the assemblies (e.g., article 30 of FIGS. 2A and 2B, article 50 of FIG. 3, article 60 of FIG. 4, and/or article 80 of FIG. 5) described herein using any of the techniques (e.g., with reference to FIGS. 6 and 7) described herein.

The hinge layer including the cross-linked polyurethane cannot be reprocessed in the melt phase after the initial cross-linking treatment. This may complicate tampering, as the hinge layer may be more difficult to separate from the biodata page without damaging the biodata page or leaving traces of the hinge layer on the biodata page. Additionally, cross-linked polyurethane may possess selected chemical and mechanical properties, such as adhesion to polycarbonate, tear resistance, flexibility, and the like, which are desirable for use in a hinge layer for a biodata page.

EXAMPLES

Example 1-4

Samples were prepared in a batch format using some or all of the following components: CAPA™ 2302A, a linear polyester diol derived from caprolactone monomer, terminated b primary hydroxyl groups, available from Perstorp Polyols, Inc., Toledo, Ohio; Desmodur N-3300A, an aliphatic polyisocyanate based on hexamethylene diisocyanate, available from Bayer MaterialScience, Pittsburgh, Pa.; Dabco® T-12 catalyst, a dibutyltin dilaurate, available from Air Products and Chemicals, Inc., Allentown, Pa.; and PBN-II®, a spunbond nylon media available from Cerex Advanced Fabrics, Inc., Cantonment, Fla.

For preparing standard sample sizes (8 grams (g)), about 7.4 g of degassed CAPA™ 2302A, about 1.0 g degassed Desmodur N-3300A, and 1 drop of Dabco® T-12 catalyst were mixed in a sample container. For preparing triple batch (25 g) sample sizes, about 22.2 g of degassed CAPA™ 2302A, about 3.0 g degassed Desmodur N-3300A, and 1 drop of Dabco® T-12 catalyst were mixed in a sample container. For hinge trial sizes (about 435 millimeters (mm) by 210 mm) a 97 g batch was prepared by mixing the following components: about 85.0 g of degassed CAPA™ 2302A, about 12.0 g degassed Desmodur N-3300A, and 1 drop of Dabco® T-12 catalyst. Finally, for hinge trial sizes with a 0.008 inch (about 0.2032 mm) thickness, a 49 g batch was prepared by mixing the following components: about 43.0 g of degassed CAPA™ 2302A, about 5.3 g degassed Desmodur N-3300A, and 1 drop of Dabco® T-12 catalyst.

For each of the batches, the mixture was mixed at about 3500 revolutions per minute (rpm) for about 15 seconds. The mixture then was poured in a T-shaped pattern (with an approximately 2 inch line width) on a PET liner, with the top of the "T" near a notch bar. The notch bar was then used to obtain a substantially constant thickness for the mixture. In some examples, a hotplate was used to maintain the mixture in solution (and extend the time to cure) to allow the sample to be smoothed to a substantially constant thickness using the notch bar.

Figure 13:
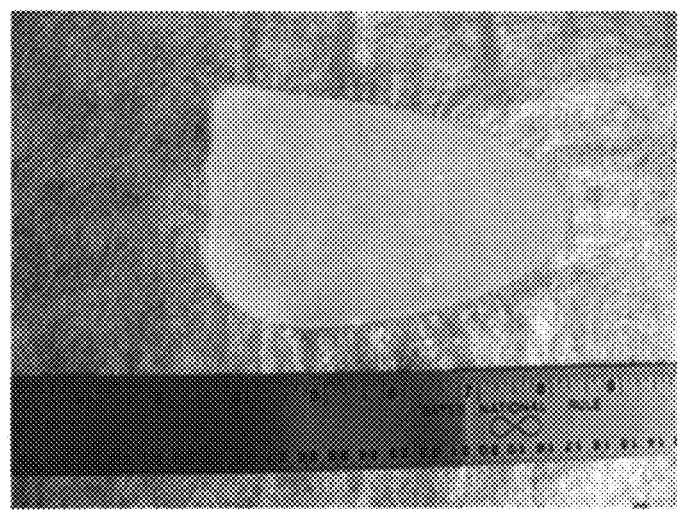
FIG. 13 is an optical image of a standard size sample of cross-linked polyurethane.

The mixture was allowed to cool until the PET wrinkled, at which time the sample was placed in an oven maintained at a temperature of 70° C. for about 24 hours. FIG. 13 is an optical image of a standard size sample.

Example 5-21

Additionally, samples were prepared with filler material within the cross-linked polyurethane. Formulations were prepared according to the procedure outlined above with respect to Example 1. When the mixture was deposited onto the PET film, the filler material was disposed within the mixture. Various materials were used as the filler, including nonwoven polyesters available under the trade designations PE85-20, PE103-20, PE120-20 from Bostik, Inc., Wauwatosa, Wis.; nonwoven nylons available under the trade designations SPA 110-6 and PA115-20 from Bostik, Inc.; nylons available under the trade designations PBSII-3005, PBN-II 100, and Cerex® from Cerex Advanced Fabrics, Inc., Cantonment, Fla.; a woven nylon available under the trade designation SR-823-32x28, from American Fiber and Finishing, Inc., Albermarle, N.C.; a polyethylene/nylon material available under the trade designation Softex® 060WXVO, from Fiberweb Simpsonville, Inc., Simpsonville, S.C.; PET materials available under the trade designations MILIFE® T10, MILIFE® T20, MILIFE® TY0503, and MILIFE® TY0505FE, from JX Nippon ANCI, Inc., Kennesaw, Ga.; a unipoly spunbond polyester available under the trade designation UNIPOLY 50 MRF, from Midwest Filtration Co., Cincinnati, Ohio; and a spunbond polyester available under the trade designations Lutradur® LD-7240, from Freudenberg Spunweb Company, Durham, N.C.; and a spunbonded polyester available under the trade designation Reemay 2214 from Midwest Filtration Co., Cincinnati, Ohio.

Examples 22-24

Figure 14:
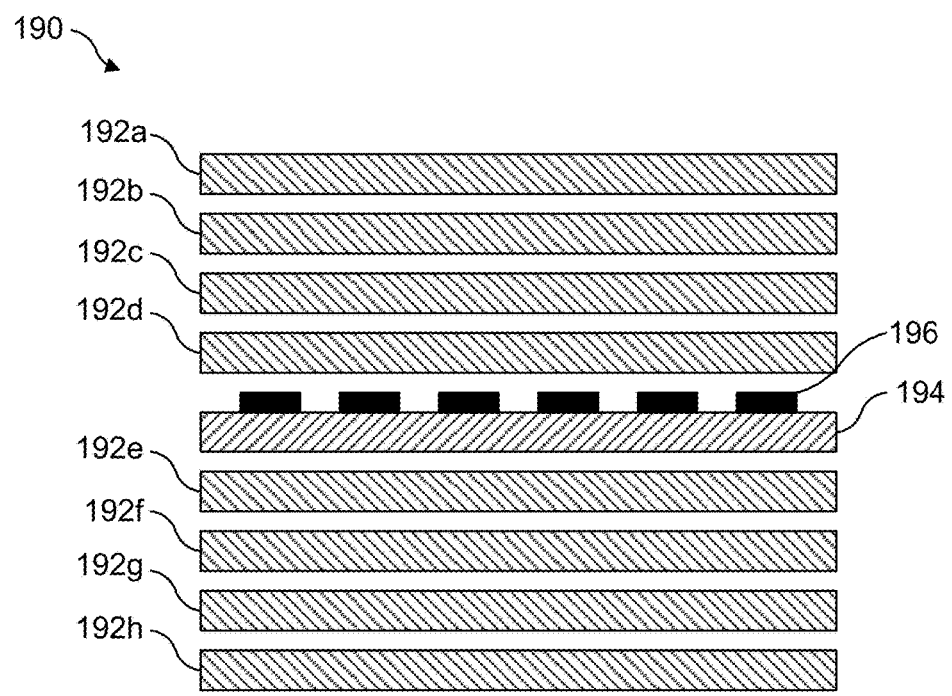
FIG. 14 is a conceptual and schematic diagram showing an example of the sandwich structure of an example of an article including a biodata page, where the article includes the layers of polycarbonate and the flexible hinge material.

In some examples, an important characteristic of the flexible hinge is minimal flow during lamination to a polycarbonate biodata page. FIG. 14 is a conceptual and schematic diagram showing an example of a sandwich structure including four layers of polycarbonate on either side of a flexible hinge material. Flow characteristics during lamination were tested by creating a 6 inch (152.4 mm) by 6 inch (152.4 mm) sandwich 190 with 0.008 inch (0.2032 mm) (four sheets 192a-192d of 0.002 inch (0.0508 mm)) clear polycarbonate above flexible hinge 194 and 0.008 inch (0.2032 mm) (four sheets 192e-192h of 0.002 inch (0.0508 mm)) clear polycarbonate below flexible hinge 194. A plurality of ink spots 196 were formed on a surface of flexible hinge 194, which would visually indicate an extent of flow of flexible hinge 194, if any. Lamination of three samples was conducted in a Carver® Press (available from Carver, Inc., Wabash, Ind.) at about 350° F. and 4000 pounds for about 10 minutes.

Figure 15:
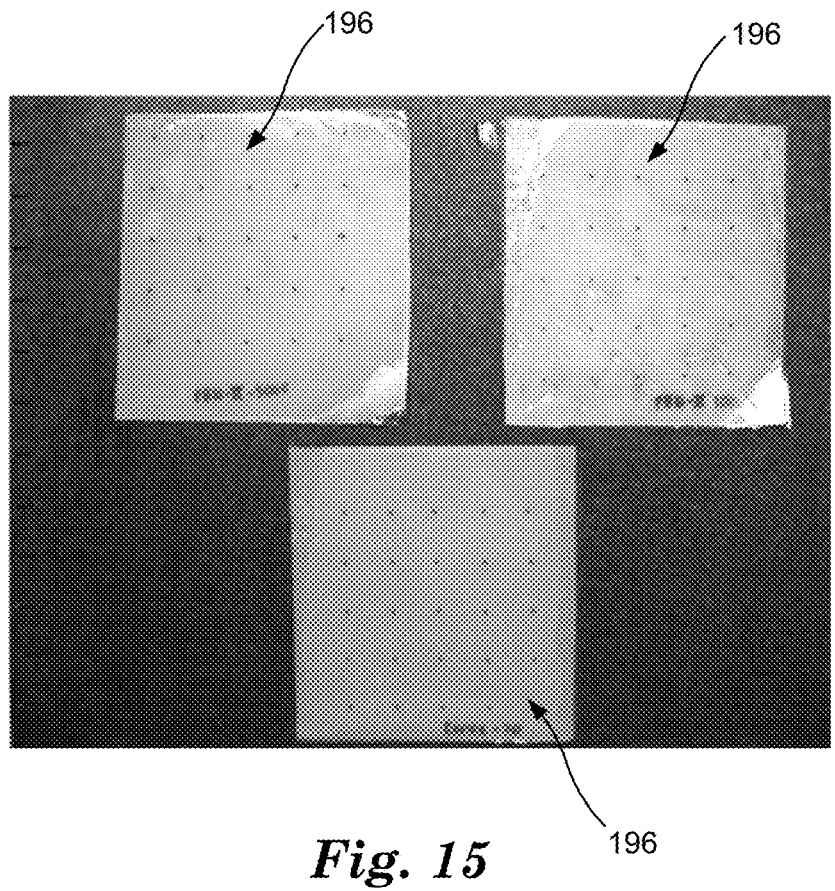
FIG. 15 is a photograph of three samples of a flexible hinge laminated to a plurality of polycarbonate layers.

FIG. 15 is a photograph of three samples after lamination under the above conditions. As shown by the plurality of ink spots 196, minimal flow occurred during the lamination process.

Examples 25-30

Additional experiments were conducted to determine the effect of the reactive polyurethane formulation on the strength of the flexible hinge as measured by mechanical testing using an Instron® testing machine, available from Instron®, Norwood, Mass. Table 1 lists the formulations for each of six samples. Samples were then measured using the Instron® testing machine on the same day (results shown in Table 2), the next day (results shown in Table 3), and one week later (results shown in Table 4) to determine the effect of time on the amount of crosslinking and mechanical properties. The results demonstrate the flexibility of different formulations of cross-linked polyurethane to tailor properties, such as break elongation and energy to break.

TABLE 1

| Sample | CAPA ™ 2302A (g) | Desmodur N-3300A (g) | Dabco ® T-12 (Drops) |
|---|---|---|---|
| 1 | 7.5 | 1.0 | 1 |
| 2 | 8.0 | 0.5 | 1 |
| 3 | 7.0 | 1.5 | 1 |
| 4 | 6.5 | 2.0 | 1 |
| 5 | 7.5 | 1.0 | 2 |
| 6 | 6.5 | 2.0 | 2 |

TABLE 2

| | Sample 1 | Sample 2 | Sample 3 | Sample 4 | Sample 5 | Sample 6 |
|---|---|---|---|---|---|---|
| Maximum Load (lbf) | 7.9 | 9.9 | 8.7 | 10.3 | 11.5 | 10.3 |
| Breaking Factor (lb/in) | 15.82 | 19.89 | 17.3 | 20.69 | 23.09 | 20.5 |
| Tensile Strength (ksi) | 0.7 | 0.9 | 0.8 | 1 | 1.1 | 0.9 |
| Break Strength (ksi) | 0.7 | 0.23 | 0.79 | 0.92 | 1.05 | 0.89 |
| Yield Stress (ksi) | — | 0.89 | — | — | — | — |
| Yield Elongation (%) | — | 2.44 | — | — | — | — |
| Break Elongation (%) | 84.6 | 14.4 | 81.5 | 78.4 | 94.1 | 86.9 |
| Modulus of Elasticity (ksi) | 2.1 | 58.2 | 2.5 | 3.2 | 3 | 3.1 |
| Energy to Break (in-lbf/in$^3$) | 36.17 | 6.49 | 38.19 | 43.41 | 60.71 | 48.62 |
| Width (in) | 0.5 | 0.5 | 0.5 | 0.5 | 0.5 | 0.5 |
| Thickness (in) | 0.022 | 0.022 | 0.022 | 0.022 | 0.022 | 0.022 |

TABLE 3

| | Sample 1 | Sample 2 | Sample 3 | Sample 4 | Sample 5 | Sample 6 |
|---|---|---|---|---|---|---|
| Maximum Load (lbf) | 8.1 | 8.1 | 9.8 | 8 | 12.1 | 9.6 |
| Breaking Factor (lb/in) | 16.22 | 16.13 | 19.59 | 16.04 | 24.22 | 19.13 |
| Tensile Strength (ksi) | 0.7 | 0.7 | 0.9 | 0.7 | 1.1 | 0.9 |
| Break Strength (ksi) | 0.75 | 0.19 | 0.9 | 0.74 | 1.04 | 0.83 |
| Yield Stress (ksi) | — | 0.61 | — | — | — | — |
| Yield Elongation (%) | — | 1.62 | — | — | — | — |
| Break Elongation (%) | 82.3 | 21.2 | 89.9 | 69.9 | 111.9 | 60.6 |
| Modulus of Elasticity (ksi) | 2 | 68.9 | 2.2 | 2.4 | 4.1 | 3.1 |
| Energy to Break (in-lbf/in$^3$) | 34.19 | 9.52 | 45.2 | 28.59 | 80.95 | 29.16 |
| Width (in) | 0.5 | 0.5 | 0.5 | 0.5 | 0.5 | 0.5 |
| Thickness (in) | 0.022 | 0.022 | 0.022 | 0.022 | 0.022 | 0.022 |

TABLE 4

| | Sample 1 | Sample 2 | Sample 3 | Sample 4 | Sample 5 | Sample 6 |
|---|---|---|---|---|---|---|
| Maximum Load (lbf) | 8.6 | 8.9 | 10.5 | 10.2 | 17.4 | 9 |
| Breaking Factor (lb/in) | 17.21 | 17.87 | 20.9 | 20.5 | 34.74 | 17.92 |
| Tensile Strength (ksi) | 0.8 | 0.8 | 1 | 0.9 | 1.6 | 0.8 |
| Break Strength (ksi) | 0.75 | 0.3 | 0.96 | 0.91 | 1.59 | 0.79 |
| Yield Stress (ksi) | — | 0.5 | — | — | — | — |
| Yield Elongation (%) | — | 1.73 | — | — | — | — |
| Break Elongation (%) | 78.2 | 39.7 | 81.8 | 59.1 | 127.2 | 41.7 |
| Modulus of Elasticity (ksi) | 2.6 | 39.8 | 2.3 | 3.2 | 4 | 3.8 |
| Energy to Break (in-lbf/in$^3$) | 35.66 | 21.84 | 40.6 | 29.54 | 130.61 | 17.99 |
| Width (in) | 0.5 | 0.5 | 0.5 | 0.5 | 0.5 | 0.5 |
| Thickness (in) | 0.022 | 0.022 | 0.022 | 0.022 | 0.022 | 0.022 |

Examples 31-33

Three reactive extrusion samples were tested for use as a flexible hinge. One contained glycerin as a cross-linking agent, while the other two samples did not include a cross-linking agent. The formulation for the sample including the cross-linking agent is shown in Table 5. The polyurethane produced by the formulation of Table 5 included 52.95 weight percent (wt. %) hard segments. The formulations for the two control samples are shown in Tables 6 and 7. The formulation in Table 6 produced a soft thermoplastic polyurethane with 50.6 wt. % hard segments and a hardness of 90 A. The formulation in Table 7 produced a hard thermoplastic polyurethane with 63.6 wt. % hard segments and a hardness of 80 D.

TABLE 5

| Material | Manufacturer | Weight Percent (%) |
|---|---|---|
| Fomrez ® 44-111 (polyesterpolyol) | Chemtura, Middlebury, Connecticut | 44.16 |
| 1,4-butane diol | | 9.50 |
| Anhydrous Glycerine | | 0.55 |
| Tinuvin ® 292 (mixture of Bis(1,2,2,6,6-pentamethyl-4-piperidinyl)-sebacate and 1-(Methyl)-8-(1,2,2,6,6-pentamethyl-4-piperidinyl)-sebacate) | BASF Corp., Florham Park, New Jersey | 2.00 |
| Tinuvin ® 571 (2-(2H-benzotriazon-2-yl)-6-dodecyl-4-methyl-phenol) | BASF Corp., Florham Park, New Jersey | 1.43 |
| Dabco ® T-12 (dibutyltin dilaurate) | Air Products and Chemicals, Inc., Allentown, Pennsylvania | 0.14 |

TABLE 5-continued

| Material | Manufacturer | Weight Percent (%) |
|---|---|---|
| Desmodur W (cycloaliphatic diisocyanate) | Bayer MaterialScience, Pittsburgh, Pennsylvania | 43.67 |

TABLE 6

| Material | Manufacturer | Weight Percent (%) |
|---|---|---|
| Fomrez ® 44-111 (polyesterpolyol) | Chemtura, Middlebury, Connecticut | 46.38 |
| 1,4-butane diol | | 9.41 |
| Tinuvin ® 292 (mixture of Bis(1,2,2,6,6-pentamethyl-4-piperidinyl)-sebacate and 1-(Methyl)-8-(1,2,2,6,6-pentamethyl-4-piperidinyl)-sebacate) | BASF Corp., Florham Park, New Jersey | 1.18 |
| Tinuvin ® 571 (2-(2H-benzotriazon-2-yl)-6-dodecyl-4-methyl-phenol) | BASF Corp., Florham Park, New Jersey | 1.76 |
| Dabco ® T-12 (dibutyltin dilaurate) | Air Products and Chemicals, Inc., Allentown, Pennsylvania | 0.088 |
| Desmodur W (cycloaliphatic diisocyanate) | Bayer MaterialScience, Pittsburgh, Pennsylvania | 41.18 |

TABLE 7

| Material | Manufacturer | Weight Percent (%) |
|---|---|---|
| Fomrez ® 44-111 (polyesterpolyol) | Chemtura, Middlebury, Connecticut | 31.25 |
| 1,4-butane diol | | 13.6 |
| Tinuvin ® 292 (mixture of Bis(1,2,2,6,6-pentamethyl-4-piperidinyl)-sebacate and 1-(Methyl)-8-(1,2,2,6,6-pentamethyl-4-piperidinyl)-sebacate) | BASF Corp., Florham Park, New Jersey | 2.00 |
| Tinuvin ® 571 (2-(2H-benzotriazon-2-yl)-6-dodecyl-4-methyl-phenol) | BASF Corp., Florham Park, New Jersey | 3.00 |
| Dabco ® T-12 (dibutyltin dilaurate) | Air Products and Chemicals, Inc., Allentown, Pennsylvania | 0.15 |
| Desmodur W (cycloaliphatic diisocyanate) | Bayer MaterialScience, Pittsburgh, Pennsylvania | 50.00 |

Samples were prepared using each formulation, and were placed into an example article including a biodata page. The article included, in order, a 100 micrometer (μm) layer of clear polycarbonate, a 100 μm layer of laser engravable polycarbonate, a 100 μm layer of white polycarbonate, the flexible hinge material sample, a 100 μm layer of white polycarbonate, a 100 μm layer of laser engravable polycarbonate, and a 100 μm layer of clear polycarbonate. The samples were laminated in a Carver® Press (available from Carver, Inc., Wabash, Ind.) at about 350° F. and 4000 pounds for about 10 minutes. Both samples without cross-linking (the formulations shown in Tables 6 and 7) showed oozing despite their difference in softness, suggesting they would not be usable as a hinge material. The sample with cross-linking additive showed no oozing behavior, suggesting it would be usable as a hinge material. The only significant difference between the controls and the cross-linked material was the presence of the glycerin, which enabled cross-linking of the polyurethane.

Examples 34-37

Samples of a thermoplastic polyurethane-coated paper composite hinge material, available under the trade designation ceFLEX™ (available from HID Global Corp., Irvine, Calif.) were irradiated using electron beam radiation to cross link the polyurethane. Three different thicknesses of ceFLEX™ (0.006 inch (0.1524 mm), 0.009 inch (0.2286 mm), and 0.012 inch (0.3048 mm)) were used. Additionally, three different radiation doses were used for each thickness: 6 MRads, 9 MRads, and 12 MRads, at a power of 300 kilovolts (kV). Control (not irradiated) samples of ceFLEX™ were also prepared All of the control ceFLEX™ samples (not irradiated) demonstrated significant oozing during the lamination process. The irradiated samples (both ceFLEX™) showed no oozing behavior, suggesting they could be usable as a hinge material. There were no significant performance differences observed between the different radiation doses for the ceFLEX™ films.

Examples 38-42

Samples of laser engravable polycarbonate biodata pages with hinge were made by laminating sheets of 3M™ Polycarbonate (PC) Security Film (available from 3M Co., St. Paul, Minn.) to the specified polyurethane (PU) film that acted as hinge material. The construction used in the pre-lamination sandwiches consisted of 100 μm clear PC film/100 μm laser-engravable PC film/100 μm white PC film/PU film/100 μm white PC film/100 μm laser-engravable PC film/100 μm clear PC film. Using this construction for the pre-laminated sandwiches, five different PU films were tested. For Example 38, 225 μm ceFLEX™ (a PU-coated paper composite material from HID Global Corp., Irvine, Calif.) was used. For Example 39, 150 μm polyurethane film, available under the trade designation PS 443-201 from Huntsman Corp., Salt Lake City, Utah, was used, as it has mechanical properties similar to the PU used in ceFLEX™. For Example 40, 300 μm 3M™ 8730-NA film (available from 3M Co., St. Paul, Minn.) was used. The sample in Example 41 was a 150 μm polyurethane film that was formed from by reacting approximately 49.9 parts by weight Fomrez® 44-111 (available from Chemtura Co., Philadelphia, Pa.), 8.4 parts by weight butanediol (available from Sigma-Aldrich Co. LLC, St. Louis, Mo.), 0.4 parts by weight glycerol (available from Sigma-Aldrich Co. LLC, St. Louis, Mo.), 0.08 parts by weight DABCO® T-12 (available from Air Products and Chemicals, Allentown, Pa.), and 41.2 parts by weight DESMODUR W (available from Bayer MaterialScience LLC, Pittsburgh, Pa.). Glycerol, a tri-functional alcohol, forms cross-links within the PU structure. The sample in Example 42 was a 150 micron polyurethane film that was formed by reacting 49.9 parts by weight polyTHF-1000 (available from BASF Co., Florham Park, N.J.), 8.4 parts by weight butanediol (Sigma-Aldrich Co. LLC, St. Louis, Mo.), 0.4 parts by weight glycerol (Sigma-Aldrich Co. LLC, St. Louis, Mo.), 0.08 parts by weight DABCO® T-12 (available from Air Products and Chemicals, Allentown, Pa.), and 41.2 parts by weight DESMODUR W (available from Bayer MaterialScience LLC, Pittsburgh, Pa.). Example 42 had a lower gel content percent (i.e., is less cross-linked) than Example 41.

An approximately 15 mm tab of the polyurethane film as a hinge was formed along a side of each sheet stack construction by stacking sheets of the following dimensions: approximately 110 mm by 150 mm sheets for the PC sheets and approximately 125 by 150 mm sheets for the PU films. The biodata page with hinge sheet stack constructions were laminated by placing the constructions between smooth metal lamination plates and placing this arrangement in a Carver® Press at about 173° C. and 120 N/cm² for 15 minutes (hot cycle) followed by 15 minutes of ramped cooling (cold cycle) from 163° C. to room temperature.

The lamination test evaluation required that all of the layers of each laminated biodata page with hinge construction must be fused together and that the PU film material show little, if any, ooze, i.e., less than 1 mm oozing of the PU film material out of the stack. Under the stated lamination parameters all of the PU film materials had low ooze (<1 mm), but the PC films were determined to not be thoroughly fused together as there were visual regions of low PC to PC bonding. Further, delamination between PC layers in the visual regions of low PC to PC bonding was possible with the use of a scalpel. These biodata page constructions and the laminations conditions stated therefore did not produce usable biodata pages.

Examples 43-47

Examples 43-47 were constructed of the same materials and formed as described for Examples 38-42, but the lamination hot cycle used was 18 minutes, a standard hot cycle known in the industry for fusing PC sheets in order to form credentials including PC such as identification cards, using the lamination equipment set forth in Examples 38-42. Evaluation of Examples 43-47 after completion of the lamination cycle found no visual regions of low PC to PC bonding, and further, no delamination could be forced between PC layers with the use of a scalpel. However, as set forth in Table 8, the examples in which the PU was not crosslinked and the example with lower crosslinking of the PU did not pass the PU ooze limitation requirement for acceptable biodata page constructions.

TABLE 8

| Example | Un-laminated Page Tear Strength (N/mm) | E' (at RT) (MPa) | E' (at 180° C.) (MPa) | Melt Onset (° C.) | Gel Content (%) | Lamination Result |
| --- | --- | --- | --- | --- | --- | --- |
| 43 | 1300 | 4.9 | 0.02 | 166 | <10 | Fail |
| 44 | 1600 | 13.0 | 0.42 | 189 | <10 | Fail |
| 45 | 1000 | 5.7 | 0.10 | 214 | ~48 | Pass |
| 46 | 1100 | 25.0 | 0.02 | 169 | ~98 | Pass |
| 47 | 1300 | 10.8 | 0.002 | 166 | ~20 | Fail |

To enable measurement of adhesion between the PU film and the rest of the biodata page, an approximately 2 cm strip of Pacothane release film (available from Pacothane Technologies, Winchester, Mass.) was placed between the PU layer and one of the adjacent white PC layers. After completion of the lamination cycle described for Examples 43-47, the biodata page was sliced along the length of the Pacothane strip from one of the surfaces of the biodata page down to the Pacothane strip. The Pacothane strip and the separated PC layers were removed from the laminate. The PC layers were fed into a clamp on an IMASS SP-2000 peel tester (available from IMASS, Inc., Accord, Mass.) and the bottom of the biodata page was affixed to moving sled using 3M™ 4008 urethane foam tape. Peel testing was performed at an angle of 180°. The sled was moved at a rate of 30 cm/min and the peel force was measured as a function of time. The average peel force was computed by the equipment. All samples showed very good adhesion between the PU film and the PC (average peel strength>1 N/mm; ISO/IEC 10373-1 states that, "any layer shall possess a minimum peel strength of 0.35 N/mm"). All of the biodata page with hinge examples were further incorporated into standard passport books. No issues pertaining to collation or sewing through the PU hinge materials was noted. Every PU material serving as a hinge provided a soft, flexible tab that allowed the books to be closed fully.

Unlaminated page tear strength of the hinge, listed in Table 8, was determined by sewing a sample of each of the example films into a standard passport book using a Bernina 1031 sewing machine (available from Bernina of America, Inc., Aurora, Ill.). The sample was sewn at an approximately 5 mm pitch with a size 75 needle, using Tex-27 white polyester thread. Each sample was tested in an MTS Tester (available from MTS Systems Corp., Eden Prairie, Minn.) in tensile mode, using 10 cm wide serrated grips. The grips were positioned to hold the polyurethane film at a distance of about 5 mm from the sewn-through hinge. The remainder of the book was bent through 180° and placed in the opposing grips at a distance of about 33 mm from the hinge. Samples were tested to failure at a separation rate of 150 mm/min. The peak load was recorded, and normalized by the starting thickness of the film as measured using a micrometer. According to ICAO N0232, "Durability of machine readable passports," a passport page is required to survive at least 60 N of load without being pulled out of the book in a similar test mode. Extrapolating the test results based upon the thickness of each example PU film thickness to a representative 200 micron thick hinge, all of examples 43-47 were determined to surpass this requirement.

Storage modulus (E') listed in Table 8 was measured by using dynamic mechanical analysis (DMA) on discs of each PU sample. An approximately 1 mm by 125 mm by 125 mm block of the sample was prepared by fusing multiple layers of the tested polyurethane film using a Carver® press at 150° C. and 0.8 MPa for 10 minutes. Two sample discs with a diameter of 7 mm and a thickness of about 1 mm were cut from the block and mounted on a shear-sandwich testing fixture from TA Instruments, Newcastle, Del. The testing fixture was mounted on a TA Instruments Q800 for DMA, with a temperature sweep from −100° C. to 250° C. at a temperature ramp rate of 2° C. per minute. The storage modulus (E') at room temperature (25° C.) and 180° C. was obtained. The melt onset temperature is defined from the storage modulus versus temperature measurement as the intersection point of the tangent of the plateau modulus and the tangent at the maximum slope of the flow regime.

Gel content percent was measured by adding each example to a pre-weighed wired mesh basket (W1) and measuring the total weight (W2). The film in the basket was then immersed in a container of tetrahydrofuran (which dissolves thermoplastic PU but not cross-linked materials). The container was set in a 55 to 60° C. water bath until the sample entirely dissolved or up to 120 minutes if the sample did not dissolve entirely. The sample basket was then removed from the tetrahydrofuran container and placed on top of a pre-weighed alumina pan (W3). The pan with the basket and any residual was dried at 120° C. for 30 minutes, then cooled to room temperature and then weighed (W4). The original film weight (W5) was calculated by subtracting W1 from W2. The film residual weight (W6) was calculated by subtracting W1 and W3 from W4. The gel content percent was calculated as W6/W5×100%. The average of two trials per sample was reported. For example 45, since the 8370NA film is black, the fraction of the black pigment that was not soluble in hot tetrahydrofuran was deducted from the average to obtain the gel content percent.

Per the above results, using a variety of PU films from different vendors with different stiffnesses and melt onset temperatures, only the PU films with gel content percent greater than 40 percent (i.e., the cross-linked thermosets) passed lamination evaluation requirements using conventional lamination conditions for PC films.

Example 48

The laser engravable polycarbonate biodata pages for Example 49 was made by laminating sheets of 3M™ Polycarbonate (PC) Security Film (available from 3M Co., St. Paul, Minn.) to the PU hinge material from Example 41 in a manner similar to Examples 43-47.

The construction used in the pre-lamination sandwiches consisted of 100 µm clear PC film/100 µm laser-engravable PC film/50 µm white PC film/PU film/50 µm white PC film/100 µm laser-engravable PC film/100 µm clear PC film. Each 50 µm white film had a 2 cm circular hole punched out such that the two holes would be in registration when the pre-laminated sandwich was constructed. Due to the transparency and colorlessness of the PC and PU films, a transparent window was created. Even though the pre-laminated sandwich was necessarily thinner in the regions of the registered holes, the lamination process smoothed the PC and PU, removing any divots such that no thickness disparity was observed between the windowed and non-windowed regions.

This window is a security feature designed to limit the ability of counterfeiters to alter or simulate a finished biodata page. This feature would not be possible when using a full-page integral hinge that is not transparent or colorless.

Example 49

A sample was made using the same construction and process described in Example 48, except that each of the 100 micron laser-engravable PC films was offset-printed to generate guilloche security print. This print was visible through the window.

Example 50

A sample was made using the same construction and process described in Example 48, except that instead of smooth metal lamination plates, plates featuring patches of microlens-shaped debossments were used as described in the PCT Application US2012/069523. The lamination plates were made by electroplating from an approximately 125 µm-thick polymer master tool into which the desired aspherical microlens pattern was cut using a laser ablation process. The plate featured oval patches of microstructure for embossing microlenses, and one such patch was aligned with the transparent window.

In a manner similar to what is described in PCT Application US2012/069523, a laser was used to irradiate portions of the laser engravable PC through the microlenses to form a floating image. The biodata page was mounted to a flat stage. The microlens-containing area of the laminated construction was exposed to the output of an SPI fiber laser, expanded by a Lynos and Edmund Optics beam expander to a diameter of 25 mm. The expanded beam was input into a galvoscanner, which, with the use of appropriate optics, produced a focused beam having a numerical aperture of approximately 0.15. The focal point of the laser beam was located approximately 8 mm above the surface of the laminate. Images were written via the laser beam into the biodata page over the transparent window, i.e. images were generated within the window as the laser charred the laser engravable PC layer, forming a composite image of a signature that appeared to float above the microlens-containing portion of the hinge material. As the window was transparent, the signature image could be seen from both sides, although the signature image appeared to float only when viewed through the side with the microlenses.

Example 51

A laser engravable polycarbonate biodata page was made by laminating sheets of 3M™ Polycarbonate (PC) Security Film (available from 3M Co., St. Paul, Minn.) to a PU hinge composite material in a manner similar to Examples 38-42. In this Example, a piece of 3M Clear to Cyan film (available from 3M Co., St. Paul, Minn.) was first attached between two pieces of 150 µm crosslinked thermoset PU material prepared in a fashion analogous to that described in Example 41. The Clear to Cyan film consisted of 2 strips each 2.5 cm by 12.5 cm in dimension, and positioned within 15 by 15 cm layers of PU such that the Clear to Cyan film was fully encased. This construction was then introduced into the prelamination biodata page film stack.

The construction used in the pre-lamination biodata page film stack consisted of 100 µm clear PC film/150 µm white laser-engravable PC film/PU film stack/150 µm white laser-engravable PC film/100 µm clear PC film. This construction was laminated in a process similar to that described in Examples 38-42. When incorporated into the pre-lamination biodata page film stack, some of the Clear to Cyan film was present in the hinge tab of the biodata page, and some was embedded between the PU and PC layers. Due to the transparency of the PU film, the color shift of the Clear to Cyan was obvious in the tab, providing a security feature that ties the hinge to the rest of the biodata page.

Example 52

The biodata page of Example 41 was sewn into a passport book using conventional book-making operations. A 2-mm wide slip of Pacothane release film was inserted in the book between the top of the hinge tab and the first visa page of the passport book, and the book was slid into a passport laminator Diletta CPL150 passport laminator (available from DILETTA Maschinentechnik GmbH, Germany) set at 150° C. for top and bottom heating in order to adhere the PU tab to the end paper of the passport book. After lamination, the Pacothane film was removed. The PU material of the tab was firmly bonded to the end-paper, providing a significant barrier to counterfeiters that would attempt to remove the biodata page from the book to alter or simulate a finished biodata page.

Various examples have been described. These and other examples are within the scope of the following claims.

The invention claimed is:
1. An article comprising:
a biodata page defining a perimeter including an edge; and
a hinge layer attached to at least a portion of the biodata page, wherein the hinge layer comprises a cross-linked thermoset elastomeric polyurethane sheet, and wherein a portion of the hinge layer extends beyond the edge to form a flexible hinge.

2. The article of claim 1, wherein the cross-linked thermoset elastomeric polyurethane sheet consists essentially of cross-linked thermoset elastomeric polyurethane.

3. The article of claim 1, wherein the hinge layer is attached to the biodata page substantially throughout the area defined within the perimeter.

4. The article of claim 1, wherein the biodata page includes a first polymer layer defining a first perimeter including a first edge and a second polymer layer defining a second perimeter including a second edge, wherein the hinge layer is attached between at least a portion of the first polymer layer and at least a portion of the second polymer layer, and wherein the portion of the hinge layer extends beyond the first edge and the second edge to form the flexible hinge.

5. The article of claim 4, wherein the first perimeter and the second perimeter are substantially aligned, and wherein the first edge and the second edge are substantially aligned.

6. The article of claim 5, wherein the hinge layer is attached to the first layer substantially throughout the area defined within the first perimeter, and wherein the hinge layer is laminated to the second layer substantially throughout the area defined within the second perimeter.

7. The article of claim 4, further comprising a third polymer layer attached to the first polymer layer and a fourth polymer layer attached to the second polymer layer.

8. The article of claim 1, wherein biodata page comprises a polycarbonate.

9. The article of claim 1, wherein biodata page comprises a laser engravable material.

10. The article of claim 9, wherein the biodata page comprises a laser engravable polycarbonate.

11. The article of claim 1, wherein the hinge layer further comprises a woven or nonwoven material substantially fully encapsulated within the cross-linked thermoset elastomeric polyurethane sheet.

12. The article page of claim 1, wherein the hinge layer is laminated to the biodata page.

13. The article of claim 1, wherein the biodata page further comprises personal information associated with a holder of the article.

14. The article of claim 1, further comprising a passport booklet, wherein the biodata page is attached to the passport booklet using the flexible hinge.

15. The article of claim 1, further comprising at least one security feature.

16. The article of claim 15, wherein the at least one security feature comprises at least one of a hologram, color printing within the biodata page, an RFID chip, one or more fluorescent dyes, one or more taggants, one or more surface structures, one or more embedded structures, one or more polarizing structures, a clear-to-cyan film, a security thread, guilloche printing, and color-shifting ink printing.

17. The article of claim 16, wherein the hinge layer comprises the at least one security feature.

18. The article of claim 16, wherein the biodata page comprises the at least one security feature.

19. The article of claim 1, wherein the hinge layer is substantially transparent.

20. The article of claim 1, wherein the hinge layer is substantially colorless.

21. The article of claim 1, wherein the biodata page comprises a transparent window and a security feature, wherein the security feature is visible through the transparent window.

22. A method comprising:
forming a hinge layer comprising a cross-linked thermoset elastomeric polyurethane sheet;
assembling the hinge layer with a biodata page, wherein the biodata page defines a perimeter including an edge, wherein a first portion of the hinge layer is positioned contacting the biodata page, and wherein a second portion of the hinge layer extends beyond the edge; and
attaching the first portion of the hinge layer to the biodata page.

23. The method of claim 22, wherein attaching the first portion of the hinge layer to the biodata page comprises laminating the first portion of the hinge layer to the biodata page.

24. The method of claim 22, wherein assembling the hinge layer with the biodata page comprises:
assembling the hinge layer between a first polymer layer and a second polymer layer, wherein the first polymer layer defines a first perimeter and a first edge, wherein the second polymer layer defines a second perimeter and a second edge, wherein the first portion of the hinge layer is positioned contacting the first polymer layer and the second polymer layer, and wherein the second portion of the hinge layer extends beyond the first edge and the second edge, and
wherein attaching the first portion of the hinge layer to the biodata page comprises:
attaching the first portion of the hinge layer to the first polymer layer and the second polymer layer.

25. The method of claim 24, wherein the first portion of the hinge layer extends substantially along the surface area of the first polymer layer defined within the first perimeter and extends substantially along the surface area of the second polymer layer defined within the second perimeter.

* * * * *